United States Patent
Cheng et al.

(10) Patent No.: US 11,364,858 B2
(45) Date of Patent: Jun. 21, 2022

(54) CORE LAYERS AND COMPOSITE ARTICLES WITH A VARIABLE BASIS WEIGHT

(71) Applicants: Peng Cheng, Forest, VA (US); Mark O. Mason, Forest, VA (US); Andrew Anderson, Forest, VA (US); Mark Fero, Forest, VA (US); Shriram Joshi, Forest, VA (US); Jonathan Rosin, Forest, VA (US); Anthony Messina, Forest, VA (US)

(72) Inventors: Peng Cheng, Forest, VA (US); Mark O. Mason, Forest, VA (US); Andrew Anderson, Forest, VA (US); Mark Fero, Forest, VA (US); Shriram Joshi, Forest, VA (US); Jonathan Rosin, Forest, VA (US); Anthony Messina, Forest, VA (US)

(73) Assignee: Hanwha Azdel, Inc., Forest, VA (US)

( * ) Notice: Subject to any disclaimer, the term of this patent is extended or adjusted under 35 U.S.C. 154(b) by 54 days.

(21) Appl. No.: 16/559,059

(22) Filed: Sep. 3, 2019

(65) Prior Publication Data
US 2020/0114839 A1  Apr. 16, 2020

Related U.S. Application Data

(60) Provisional application No. 62/726,681, filed on Sep. 4, 2018.

(51) Int. Cl.
*B32B 37/24* (2006.01)
*B32B 5/26* (2006.01)
(Continued)

(52) U.S. Cl.
CPC ............ *B60R 13/0225* (2013.01); *B32B 5/18* (2013.01); *B32B 5/26* (2013.01); *B32B 37/24* (2013.01);
(Continued)

(58) Field of Classification Search
CPC ... B29L 2031/3011; B32B 5/142; B32B 5/18; B32B 5/26; B32B 37/24;
(Continued)

(56) References Cited

U.S. PATENT DOCUMENTS 3,819,781 A   6/1974 Kornylak
4,409,274 A   10/1983 Chaplin
(Continued)

FOREIGN PATENT DOCUMENTS

WO   WO-9907579 A1 * 2/1999 ......... B60R 13/0225
WO   2018005197   1/2018

OTHER PUBLICATIONS

ISR/WO for PCT/US19/49343 mailed on Jan. 31, 2020.
ISR/WO for PCT/US19/49331 mailed on Jan. 31, 2020.

*Primary Examiner* — Michael A Tolin
(74) *Attorney, Agent, or Firm* — Rhodes IP PLC; Christopher Rhodes

(57) ABSTRACT

Methods of producing core layers with a variable basis weight across a width of the core layer are described. The core layers can be used in vehicle headliners to permit proper side air bag deployment in the vehicles during crashes. Systems and various materials used to produce the core layers are also described.

20 Claims, 23 Drawing Sheets

(51) Int. Cl.
  *D04H 1/4218* (2012.01)
  *D04H 1/732* (2012.01)
  *B60R 13/02* (2006.01)
  *B60R 21/214* (2011.01)
  *B32B 5/18* (2006.01)
  *B29L 31/30* (2006.01)
  *B32B 38/00* (2006.01)

(52) U.S. Cl.
  CPC ......... *B60R 21/214* (2013.01); *D04H 1/4218* (2013.01); *D04H 1/732* (2013.01); *B29L 2031/3011* (2013.01); *B32B 2038/0084* (2013.01); *B32B 2260/021* (2013.01); *B32B 2262/0253* (2013.01); *B32B 2262/101* (2013.01); *B32B 2305/022* (2013.01); *B32B 2605/003* (2013.01); *B60R 2013/0287* (2013.01)

(58) Field of Classification Search
  CPC ...... B32B 2037/243; B32B 2038/0084; B32B 2260/021; B32B 2262/0253; B32B 2262/101; B32B 2305/022; B32B 2605/003; B60R 13/0212; B60R 13/0225; B60R 13/0231; B60R 2013/0287; B60R 21/213; B60R 21/214; B60R 21/215; B60R 21/2165; B60R 21/232; D04H 1/4218; D04H 1/70; D04H 1/72; D04H 1/732

See application file for complete search history.

(56) References Cited

U.S. PATENT DOCUMENTS

| | | |
|---|---|---|
| 5,456,490 A | 10/1995 | Carter |
| 5,779,232 A | 7/1998 | Totani |
| 5,834,082 A | 11/1998 | Day |
| 2003/0224145 A1* | 12/2003 | Campion ................. D04H 1/72 428/171 |
| 2006/0261508 A1 | 11/2006 | Lustinger |
| 2008/0032094 A1* | 2/2008 | Raghavendran ........... C08J 5/04 428/138 |
| 2009/0155522 A1 | 6/2009 | Raghavendran |
| 2013/0101822 A1 | 4/2013 | Kunal |
| 2014/0051310 A1 | 2/2014 | Kunal |
| 2017/0043814 A1 | 2/2017 | Yang |
| 2017/0050408 A1 | 2/2017 | Park |
| 2017/0225428 A1 | 8/2017 | Muir |
| 2020/0130611 A1 | 4/2020 | Wei |

* cited by examiner

CORE LAYERS AND COMPOSITE ARTICLES WITH A VARIABLE BASIS WEIGHT

PRIORITY APPLICATION

This application claims priority to, and the benefit of, U.S. Provisional Application No. 62/726,681 filed on Sep. 4, 2018, the entire disclosure of which is hereby incorporated herein by reference for all purposes.

TECHNOLOGICAL FIELD

Certain configurations described herein are directed to core layers and composite articles including them that comprise a variable basis weight at different areas of the core layer.

BACKGROUND

Composite articles have many different applications. Automotive vehicles often use composite articles in various interior and exterior applications.

SUMMARY

Certain aspects, features, embodiments and examples of a core layer comprising a variable basis weight are described below. The core layer can be used in many different applications including, but not limited to, composite articles used in automotive interior and exterior applications.

In a first aspect, a method of producing a vehicle headliner comprising a composite material configured to permit air bag deployment is described. In some examples, the method comprises disposing a dispersion comprising a substantially homogeneous mixture of a thermoplastic material and reinforcing fibers onto a forming support element, providing a pressure to less than an entire surface of the forming support element comprising the disposed foam to provide a porous web comprising a variable basis weight at different areas of the web, and drying the porous web comprising the variable basis weight to provide a composite material comprising a porous core layer with a variable basis weight across a width of the porous core layer.

In certain examples, the method comprises providing a negative pressure to an underside of the forming support element comprising the disposed dispersion. In other examples, the method comprises providing the negative pressure to a central area of the forming support element comprising the disposed dispersion to provide the central area with a higher basis weight than at edges of the porous core layer. In some embodiments, the method comprises providing a positive pressure to a top side of the forming support element comprising the disposed dispersion. In other embodiments, the method comprises providing the positive pressure to a central area of the forming support element comprising the disposed dispersion to provide the central area with a higher basis weight than at edges of the porous core layer.

In other examples, the method comprises providing a negative pressure to an underside of the forming support element comprising the disposed dispersion and providing a negative pressure to a top side of the forming support element comprising the disposed dispersion. In some embodiments, the method comprises providing a greater negative pressure to the underside of the forming support element than the negative pressure providing at the top side of the forming support element at a central area of the forming support element to provide the central area with a higher basis weight than at edges of the porous core layer.

In some instances, the method comprises providing negative pressure to an underside of the forming support element and providing a positive pressure to a top side of the forming support element. In other examples, the method comprises configuring the negative pressure providing to the underside of the forming support element to be substantially uniform across the underside of the forming support element and configuring the top side pressure to be greater at a central area of the forming support element to provide the central area with a higher basis weight than at edges of the porous core layer.

In some examples, the method comprises disposing a mask on an underside of the forming support element and providing a negative pressure to areas of the web not covered by the disposed mask.

In other examples, the method comprises disposing a first skin on a first surface of the porous core layer. In some examples, the disposed first skin comprises a variable basis weight. In other examples, the method comprises disposing a second skin on a second surface of the porous core layer. In certain examples, the disposed second skin comprises a variable basis weight.

In certain embodiments, the method comprises coupling a second porous core layer to the porous core layer. In some examples, the second porous core layer comprises a substantially uniform basis weight at different areas of the second porous core layer. In further examples, the second porous core layer comprises a variable basis weight at different areas of the second porous core layer. In some examples, the method comprises coupling a first skin to a first surface of the porous core layer. In other examples, the method comprises coupling a decorative layer to the disposed second skin. In additional examples, the method comprises disposing the dispersion on the forming support element while the pressure is being provided to the forming support element.

In another aspect, a method of producing a vehicle headliner comprising a composite material configured to permit air bag deployment is described. In some embodiments, the method comprises disposing a dispersion comprising a homogeneous mixture of a thermoplastic material and reinforcing fibers onto a forming support element to provide a web of open celled structures formed by the reinforcing fibers held together by the thermoplastic material, drying the web to provide a porous core layer, disposing a first skin comprising a variable basis weight on a first surface of the porous core layer to provide a composite material with a variable basis weight at different areas of the composite material.

In some examples, the method comprises configuring the first skin to comprise a higher basis weight at a central area of the skin than a basis weight at an edge of the first skin. In other examples, the method comprises disposing a second skin comprising a variable basis weight on a second surface of the porous core layer to provide the composite material with the variable basis weight at different areas of the composite material. In certain examples, the method comprises configuring the first skin and the second skin to be the same. In other examples, the method comprises configuring each of the first skin and the second skin to comprise a higher basis weight at a central area of each skin than a basis weight at an edge of each skin. In additional examples, the method comprises comprising configuring the first skin and the second skin to be different.

In some examples, the method comprises providing a pressure to the disposed dispersion to provide a web comprising a variable basis weight. In some examples, the method comprises configuring the provided pressure as a negative pressure. In other examples, the method comprises configuring the provided pressure as a positive pressure. In some embodiments, the method comprises applying additional reinforcing fibers to the disposed web to provide a web with a variable basis weight.

In an additional aspect, the method comprises configuring a composite material comprising a porous core layer formed from a thermoplastic material and reinforcing fibers to promote failure of the composite material at the edges during deployment of a vehicle air bag, wherein the composite material comprises a variable basis weight with a basis weight at a central area of the composite material being greater than a basis weight at edges of the composite material to promote the failure of the composite material at the edges during deployment of the vehicle air bag.

In some examples, the method comprises configuring the composite material with a skin layer disposed on each surface of the porous core layer. In other examples, the method comprises configuring each skin to comprise a substantially uniform basis weight. In further examples, the method comprises configuring at least one skin to comprise a variable basis weight. In other examples, the method comprises configuring a basis weight at each edge of the porous core layer to be at least 10% less than an average basis weight at a central area of the porous core layer. In some examples, the method comprises configuring a basis weight at each edge of the porous core layer to be at least 15% less than an average basis weight at a central area of the porous core layer. In further examples, the method comprises configuring a basis weight at each edge of the porous core layer to be at least 20% less than an average basis weight at a central area of the porous core layer. In some embodiments, the method comprises configuring a basis weight at each edge of the porous core layer to be at least 25% less than an average basis weight at a central area of the porous core layer. In other examples, the method comprises configuring a basis weight at a central area of the core layer to be about 500 grams per square meter (gsm) to about 2000 gsm, configuring a basis weight at each edge of the porous core layer to be at least 10% less than the basis weight at the central area of the core layer, and configuring a basis weight of a transition area between the central area and each edge to comprise a sloping basis weight. In some embodiments, the method comprises configuring the composite material as a vehicle headliner to promote the failure of the composite material at the edges during deployment of side air bags of the vehicle.

In another aspect, a headliner kit comprising a vehicle headliner comprising a porous core layer formed from a thermoplastic material and reinforcing fibers and configured to promote failure of the vehicle headliner at edges during deployment of a vehicle air bag, wherein the vehicle headliner comprises a variable basis weight with a basis weight at a central area of the vehicle headliner being greater than a basis weight at the edges of the vehicle headliner to promote the failure of the vehicle headliner at the edges during deployment of the vehicle air bag, and instructions for installing the headliner in a vehicle space configured to receive the vehicle air bag is provided.

In some embodiments, the vehicle headliner further comprises a skin layer disposed on each side of the core layer. In other embodiments, the vehicle headliner further comprises a decorative layer disposed on one of the skin layers.

In certain examples, the basis weight in a cross direction at the central area is at least 20% greater than the basis weight at the edges in the cross direction. In other embodiments, the basis weight at the central area is 500 gsm to 2000 gsm and the basis weight at the edges is at least 10% less in a cross direction than the basis weight at the central area.

In an additional aspect, a system for producing a porous core layer with a variable basis weight comprises a forming support element configured to receive a mixture of a thermoplastic material and reinforcing fibers, a pressure device configured to fluidically couple to a first surface of the forming support element to provide a differential pressure to different areas of the forming support element to provide a web comprising a variable basis weight, and a dryer configured to dry the web to form the porous core layer.

In some examples, the system comprises a head box configured to receive the thermoplastic material and reinforcing fibers and mix the received thermoplastic material and reinforcing fibers to provide a substantially homogeneous dispersion of the thermoplastic material and reinforcing fibers. In some embodiments, the system comprises a pair of rollers configured to receive the forming support element to compress the web formed from the mixture of the thermoplastic material and the reinforcing fibers. In other examples, the system comprises a second pressure device configured to fluidically couple to the forming support element at a second surface of the forming support element, wherein the first surface is opposite the second surface. In some examples, the pressure device is configured to provide a negative pressure to the forming support element and the second pressure device is configured to provide a positive pressure to the forming support element.

In another aspect, a composite article comprises a porous core layer comprising a web of open celled structures formed by the reinforcing fibers held together by the thermoplastic material, wherein the porous core layer comprises a variable basis weight across a width of the porous core layer, and a skin layer coupled to the porous core layer.

In some examples, the porous core layer comprises a lower basis weight at cross direction edges than at a central area. In certain examples, the composite article comprises a transition zone between each of the edges and the central area, wherein a basis weight of the transition zone is variable. In other examples, the transition zone comprises a basis weight/distance slope of greater than 0 gsm/cm and up to 30 gsm/cm. In some examples, the basis weight/distance slope is linear from the edge to the central area. In other examples, the reinforcing fibers comprise glass fibers. In some embodiments, the thermoplastic material comprises a polyolefin material. In other examples, the porous core layer comprises a lofting agent in the porous core layer. In some examples, the porous core layer comprises a flame retardant agent in the porous core layer. In other examples, an average basis weight at the edges is at least 20% less than an average basis weight at the central area.

In another aspect, a vehicle comprises a headliner comprising the composite article of described herein.

Additional aspects, embodiments, examples, and configurations are described in more detail below.

BRIEF DESCRIPTION OF THE SEVERAL VIEWS OF THE DRAWINGS

Certain features, configurations, aspects and embodiments are described below with reference to the accompanying figures in which.

The skilled person in the art, given the benefit of this disclosure, will recognize the illustrations in the figures are provided merely for illustration purposes and are not intended to limit the dimensions, configurations, shapes and features of the technology described herein.

DETAILED DESCRIPTION

Certain specific examples are described in reference to producing a core layer and/or composite articles including a core layer. Reference may be made to an underside, bottom, top, etc. The exact placement of any one component relative to an underside, bottom, top, etc. of a core layer may vary as desired. No particular orientation or arrangement of a component, structure, etc. is intended to be required unless otherwise stated.

In certain examples, in the automotive industry, a product with lighter weight, lower cost, and higher fuel efficiency is generally favorable. The increasing demand for improving fuel efficiency is triggered by the concerns of global warming. The Environmental Protection Agency (EPA) has been regulating the automotive companies to reduce vehicle exhaust emissions and fuel consumption without sacrificing occupant safety. Empirically speaking, 10% weight reduction can contributes to about a 8-10% of fuel economy improvement. The trend of weight reduction has driven a continuous decrease in the amount of steel and cast irons. Lightweight reinforced thermoplastic (LWRT) materials are capable of reducing vehicle weight and improving fuel efficiency. The composite materials (e.g. SuperLite®) manufactured by Hanwha Azdel Inc., are much lighter (0.1-0.8 g/cm3) than steels and cast irons. Another attribute of using LWRT is that it has much better formability than other materials, which gives more room of manufacturability and functionality for the original equipment manufacturers (OEMs).

In some examples, the core layers described herein can be used in interior automotive application such as, for example, vehicle headliners. Headliners require stiffness for easy handling and high performance, but if they are too stiff, consistent deployment of the side curtain airbags may be impaired. Usually, lower basis weight results in lower mechanical properties (e.g. flexural peak load, stiffness, etc.). By varying the basis weight across the width of the core layer, improved side air bag deployment while maintaining headliner stiffness can be achieved.

Figure 1:
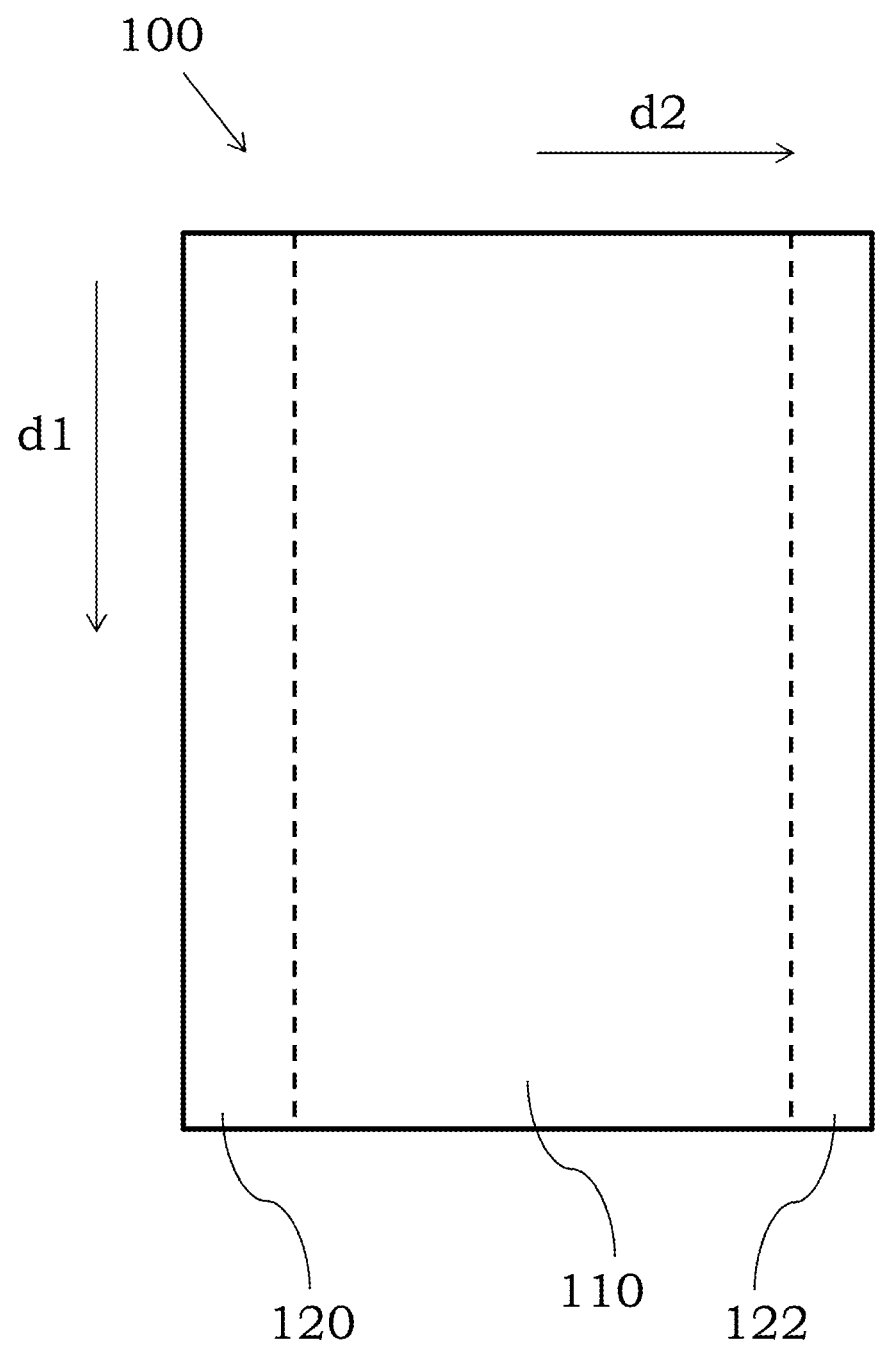
FIG. 1 is an illustration of a core layer comprising a variable basis weight across a width of the core layer, in accordance with some examples.

In certain embodiments, one or more edges of the core layers described herein may comprise a different basis weight than a central area of the core layer. Referring to FIG. 1, an illustration of a core layer with areas of varying or different basis weights is shown. The core layer 100 may comprise a central area 110 and edges 120, 122. A basis weight of the central area 110 can, on average, be higher than a basis weight at one or more of the edges 120, 122. In some examples, a basis weight of the central are 110 may be higher than at both edge 120, 122. For reference purposes, the direction d1 is generally referred to as the machine direction (MD) and the direction d2 is generally referred to as the cross direction (CD). If desired, edges in the cross direction d1 may also comprise a different basis weight or the same basis weight as at a center of the core layer 100.

Figure 2:
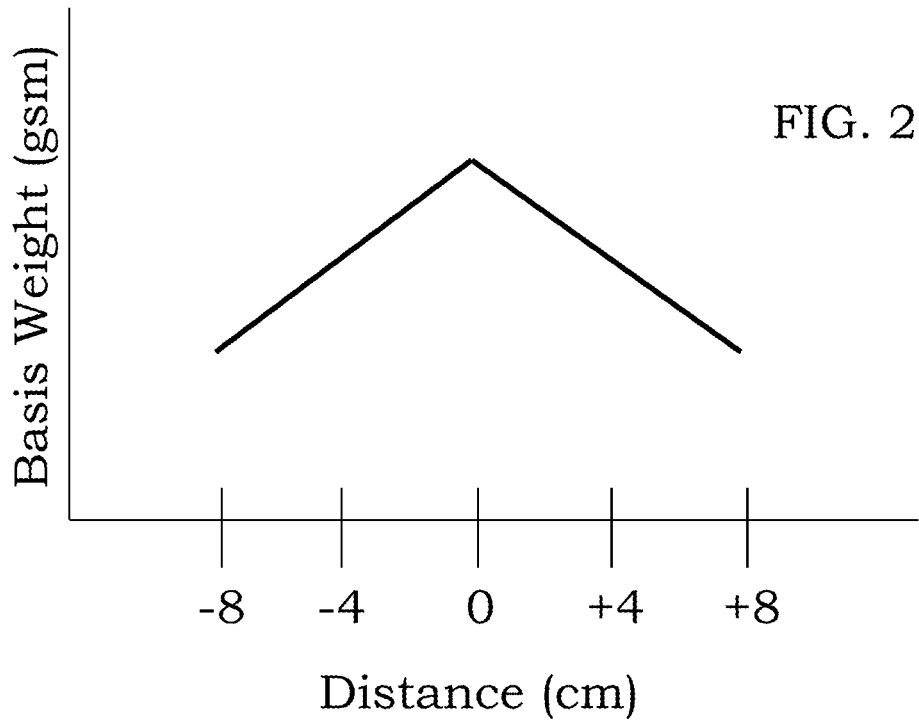
FIG. 2 is a graph showing basis weight differences at different areas of the core layer, in accordance with certain examples.
Figure 3:
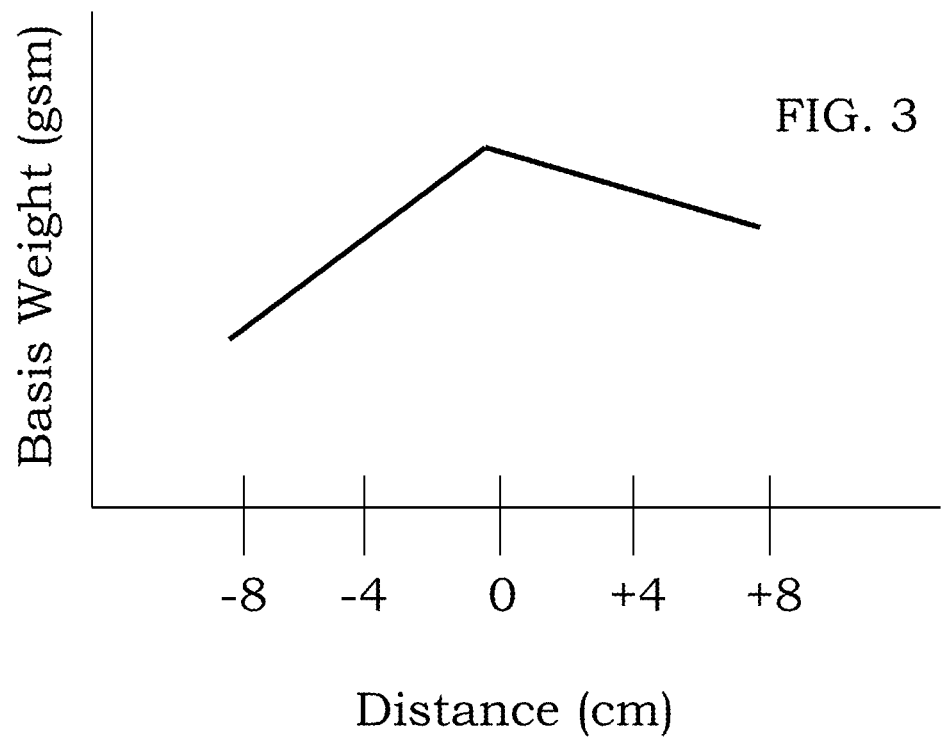
FIG. 3 is another graph showing basis weight differences at different areas of the core layer, in accordance with certain examples.

In some embodiments, the basis weight may be sloping from the central area 110 to the edges 120, 122 such that there is a gradual, e.g., linear or non-linear, decrease in the basis weight from a center of the core 100 toward the edges 120, 122. This configuration is illustrated graphically in FIG. 2 where the "0" position is the center of the core layer 100, the negative distance moves laterally in the cross direction d2 toward the edge 120, and the positive distance moves laterally in the cross direction d2 toward the edge 122. In this illustration, the basis weight decreases linearly from the center of the core to outer edges in a generally symmetric manner, e.g., the basis weight/distance slope is linear and substantially the same across the width of the core layer. If desired, however, the slope may be different from the center toward the edges of the core. One illustration is shown in FIG. 3 where the basis weight toward the edge 120 decreases more than a basis weight from the center toward the edge 122. In such instances, it may be desirable to position the edge with the larger decrease in basis weight adjacent to a vehicle air bag or other areas where failure of the core layer is desirable under certain scenarios, e.g., during air bag deployment.

Figure 4:
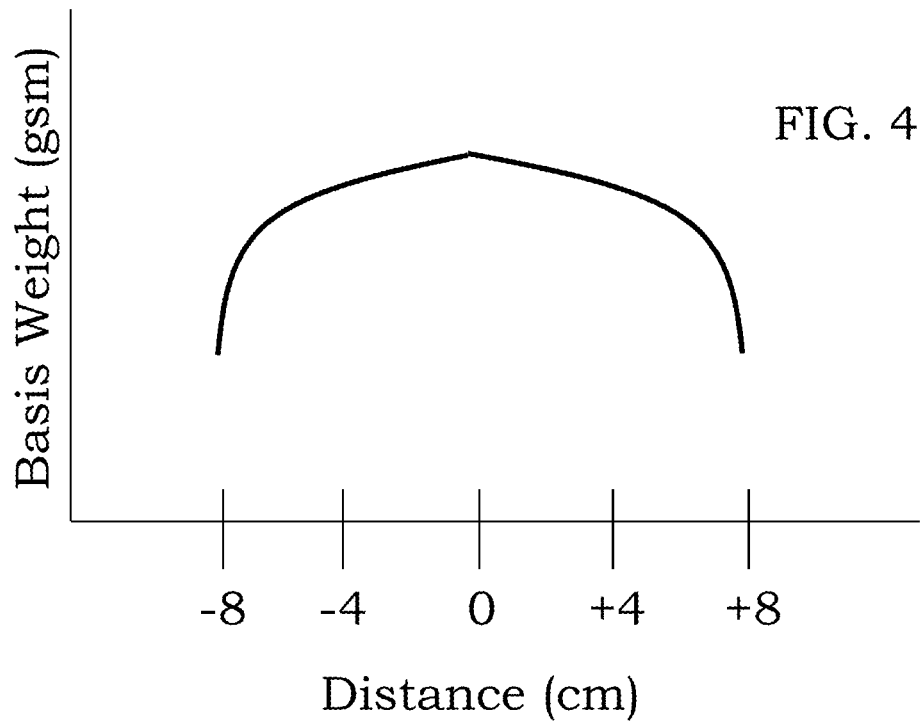
FIG. 4 is another graph showing basis weight differences at different areas of the core layer, in accordance with some embodiments.
Figure 5:
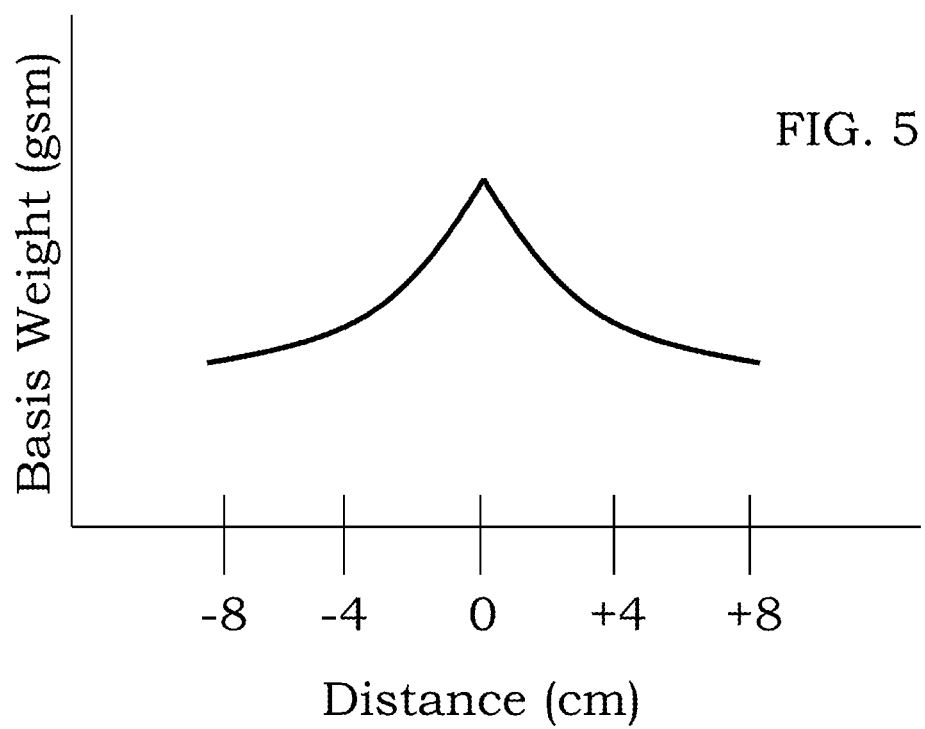
FIG. 5 is another graph showing basis weight differences at different areas of the core layer, in accordance with some embodiments.
Figure 6:
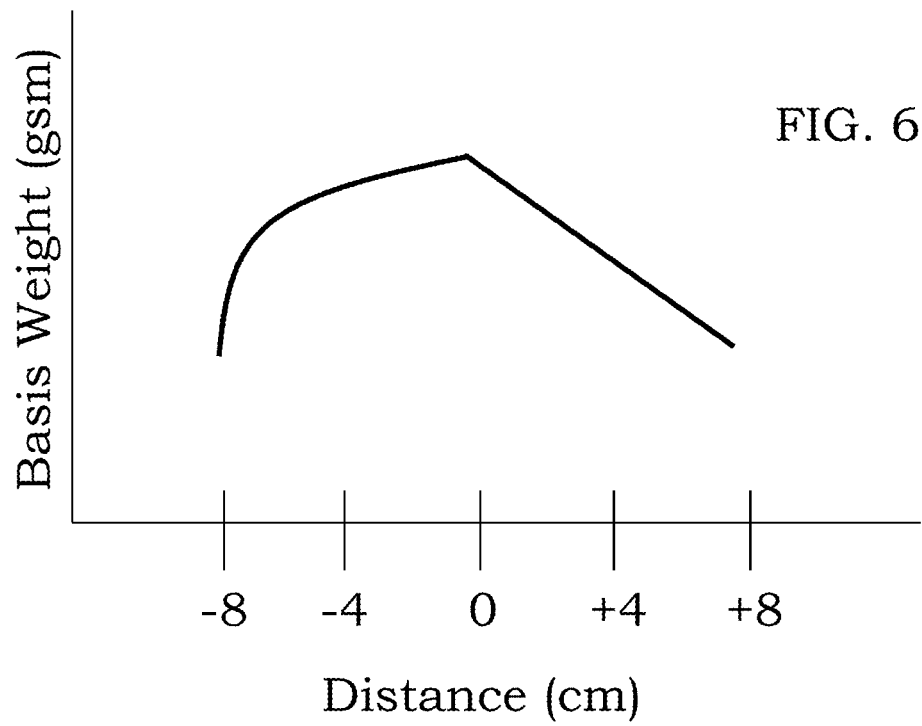
FIG. 6 is another graph showing basis weight differences at different areas of the core layer, in accordance with certain embodiments.

In certain examples, the change in basis weight need not be linear across the width of the core layer. Referring to FIG. 4, a graph is shown where the basis weight across the width of the core layer decreases in a non-linear manner from the center toward the edges. In this illustration the basis weight drops sharply toward the outer portion of the edges of the core layer. Another illustration of a non-linear decrease in basis weight from a center of a core layer to edges of a core layer is shown in FIG. 5. In this illustration, the basis weight decreases quickly moving away from the center and levels off toward the edges of the core layer. Another illustration is shown in FIG. 6 where a decrease in basis weight is non-linear in one direction toward one edge of the core layer, and a decrease in basis weight is linear in another direction toward another edge of the core layer. If desired, different non-linear decreases in basis weight from the center the edges of the core layer may also be present.

Figure 7:
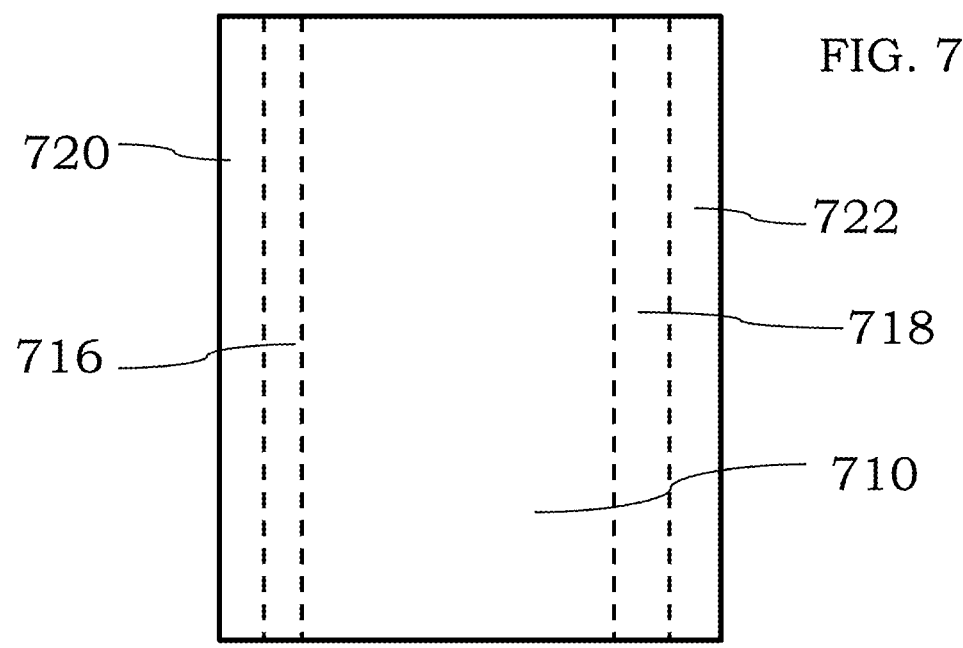
FIG. 7 is an illustration showing a core layer with transition zones of variable basis weight, in accordance with some examples.
Figure 8:
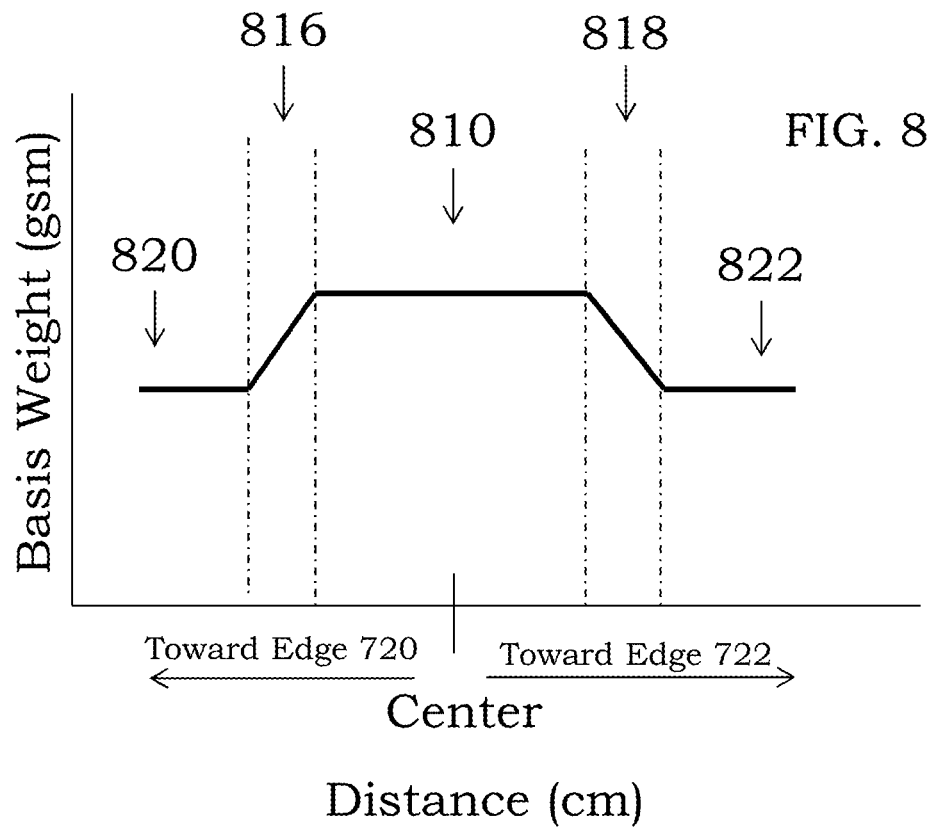
FIG. 8 is an illustration showing a basis weigh profile of a core layer with transition zones of variable basis weight, in accordance with some examples.

In certain embodiments, the basis weight decrease from center to edge of the core layer may also comprise one or more transition areas or zones. Referring to FIG. 7, a core layer is shown comprising a central area 710, transition zones 716, 718 and edges 720, 722. In some examples, a basis weight of the central area 110 may be substantially constant across the width of the board, e.g., across the cross direction. A basis weight can then decrease in the transition zones 716, 718 moving toward the edges 720, 722, respectively. The basis weight at the edges 720, 722 may be substantially constant. A graphical illustration of this configuration is shown in FIG. 8 where "0" marks a center position of the core layer of FIG. 7. A basis weight across the central area 710 is shown as area 810, a basis weight across the edges 720, 722 is shown as areas 820, 822, respectively, and the basis weight in the transition zones 716, 718 is shown as areas 816, 818. In some examples, the basis weight in the transition zones may decrease by about 2 gsm/cm to about 20 gsm/cm, more particularly a decrease of about 5 gsm/cm to about 20 gsm/cm in the transition zones 716, 718. The decrease in basis weight in the transition zone 716 need not be the same as the decrease in basis weight in the transition zone 718. Further, the basis weight in one of the transition zones 716, 718 may decrease linearly, and the basis weight in the other one of the transition zones 716, 718 may decrease in a non-linear manner. In some examples, only a single transition zone may be present in a core layer. For example, where the core layer is used in a composite article configured as a vehicle headliner, it may only be desirable to have a lower basis weight at a single edge adjacent to a vehicle air bag or other devices or sensors. Referring again to FIGS. 7 and 8, a basis weight in the central area 710 is substantially constant across the cross direction of the central area 710. Similarly, a basis weight in the edges 720, 722 is substantially constant across the cross direction.

Figure 9:
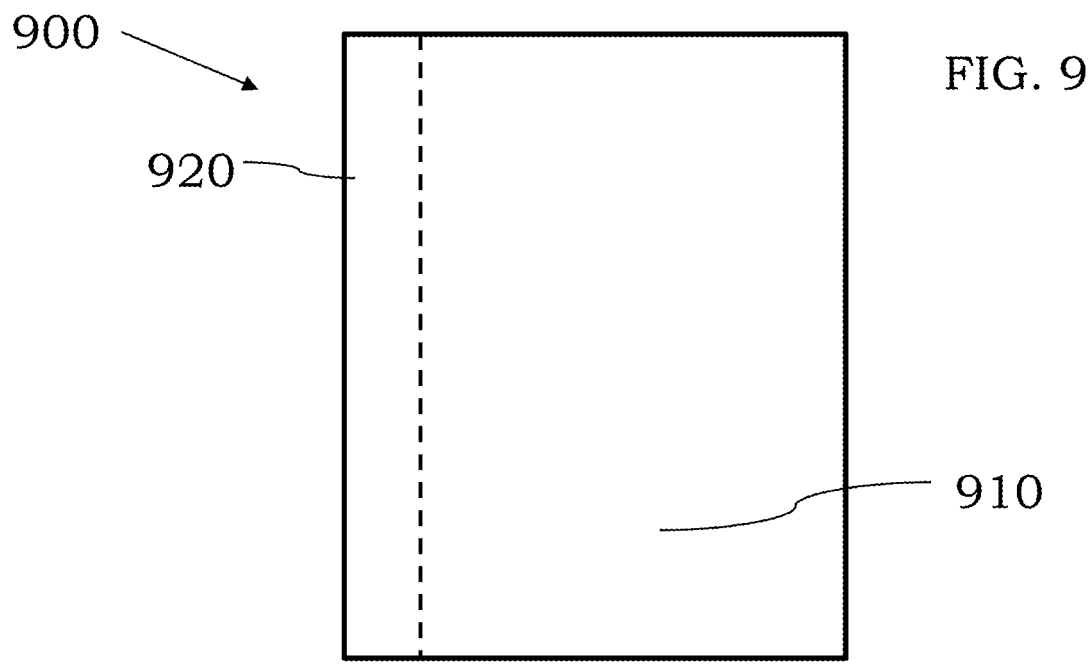
FIG. 9 is an illustration of a core layer with a single edge of variable basis weight, in accordance with certain examples.
Figure 10:
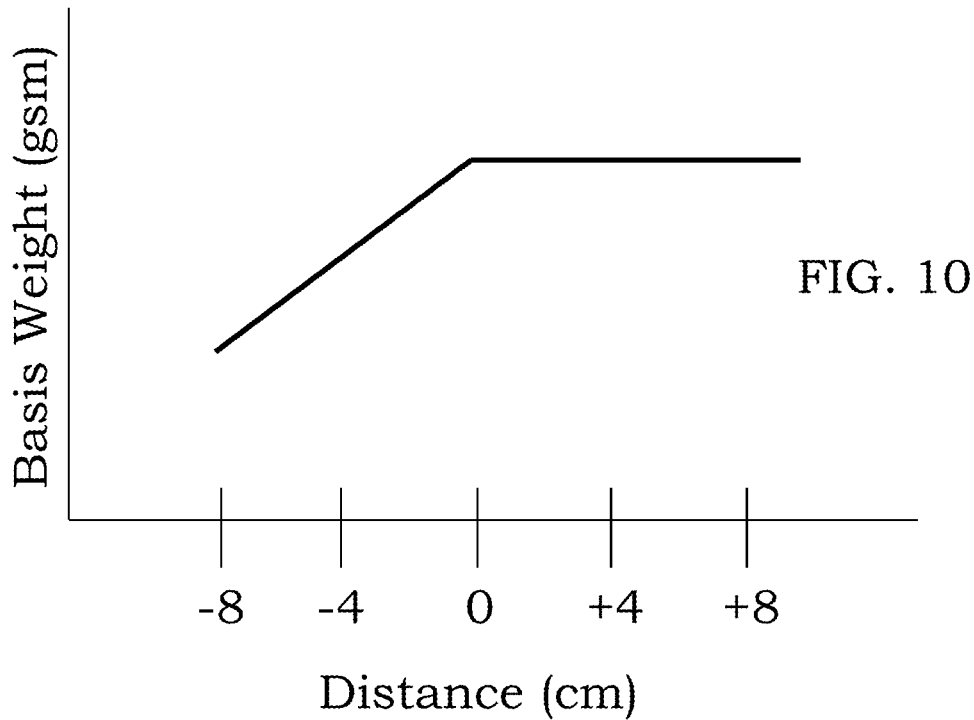
FIG. 10 is a graph showing a basis weight profile for a core layer with a single edge of variable basis weight, in accordance with some examples.
Figure 11:
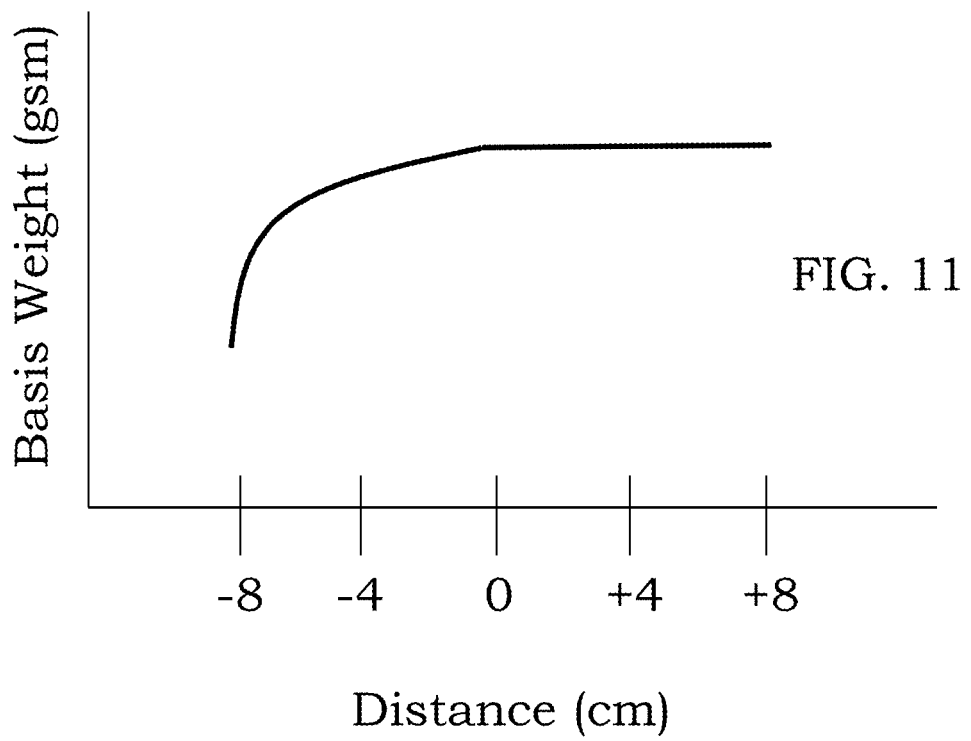
FIG. 11 is another graph showing a basis weight profile for a core layer with a single edge of variable basis weight, in accordance with some examples.
Figure 12:
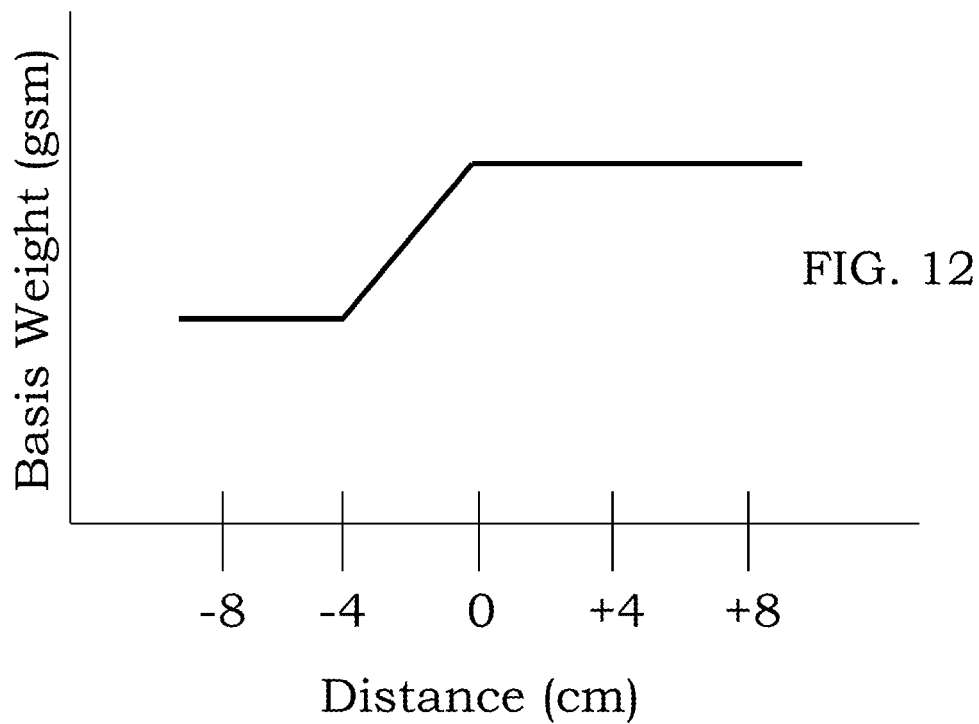
FIG. 12 is another graph showing a basis weight profile for a core layer with a single edge of variable basis weight, in accordance with some examples.

In certain configurations, it may be desirable to configure a core layer where only one edge of the core layer comprises a different basis weight than a central area. Referring to FIG. 9, a core layer 900 is shown that comprises a central area 910 and an edge 920 with a different basis weight than a basis weight of the central area 910. In some instances, a basis weight of the central area 910 can, on average, be higher than a basis weight at the edge 920. Several of many different possibilities for different basis weight profiles of the core layer 910 are shown graphically in FIGS. 10-12. Referring to FIG. 10, a basis weight profile is shown where the basis weight of the central area 910 is substantially constant, and moving toward the edge 920 provides a linear decrease in basis weight. Referring to FIG. 11, a basis weight profile is shown where the basis weight of the central area 910 is substantially constant, and moving toward the edge 920 provides a non-linear decrease in basis weight. Referring to FIG. 12, a basis weight profile is shown where there is a stepped basis weight change, e.g., as might be present where a transition zone exists between the central area 910 and the edge 920. In this configuration, the basis weight drops linearly (though it may drop non-linearly in the transition zone if desired) and then levels off to be substantially constant at the edge 920. Other basis weight profiles will be recognized by the skilled person, given the benefit of this disclosure.

Figure 13:
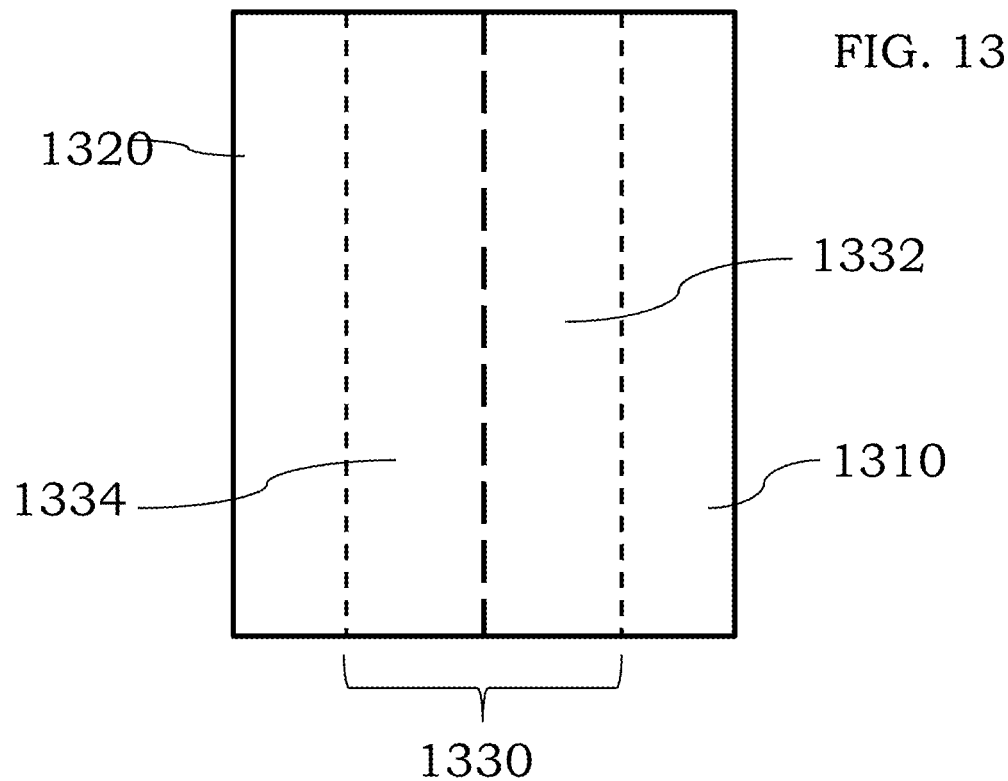
FIG. 13 is an illustration showing an expanded view of a transition zone, in accordance with some embodiments.
Figure 14:
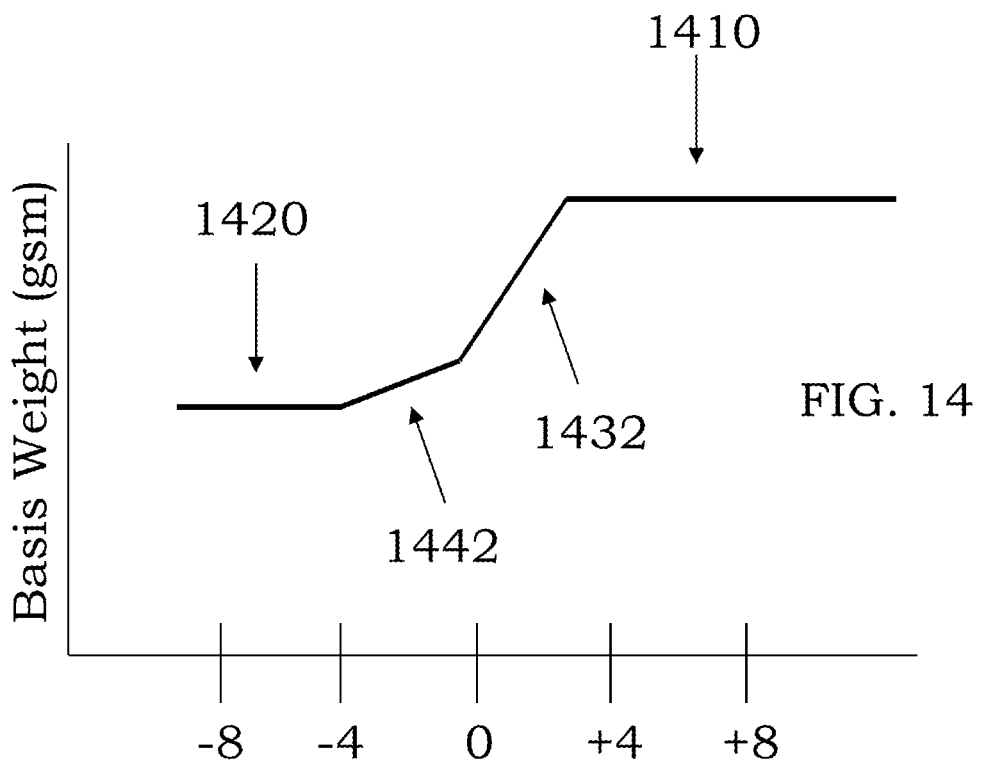
FIG. 14 is a graph showing a basis weight profile in a transition zone, in accordance with some examples.

In some embodiments, the transition zone may comprise more than a single zone or region. Referring to FIG. 13, an expanded view of a transition zone or region 1330 is shown that comprises areas 1332, 1334. A central region 1310 is shown being positioned adjacent to the transition region 1332. The change in basis weight in the transition regions 1332, 1334 need not be the same. For example and referring to FIG. 14, a basis weight 1410 of the region 1310 and a basis weight 1420 of the region 1320 are substantially constant. A basis weight 1432 of the transition region 1332 decreases by a larger slope than a basis weight 1442 of the transition region 1332. While linear decreases in basis weight are shown in FIG. 14 for the transition regions 1332, 1334, the basis weight in one or both of the transition regions 1332, 1334 could be non-linear.

Figure 15:
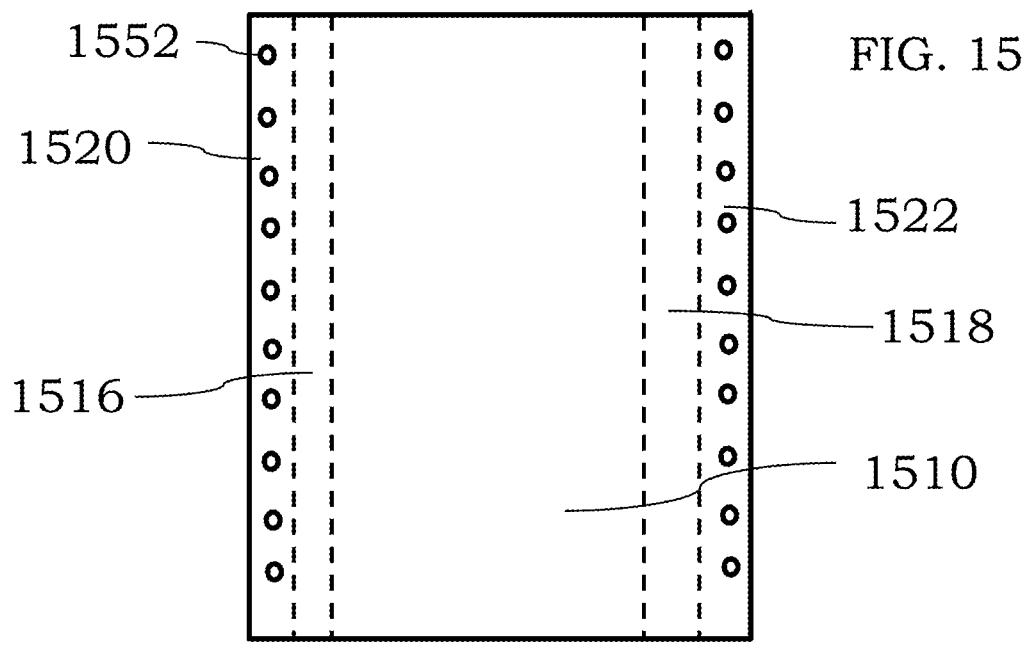
FIG. 15 is an illustration showing a core layer comprising apertures at the edges, in accordance with some embodiments.

In certain configurations, it may be desirable to have a decreased basis weight at the edges of a core layer and/or composite article comprising the core layer by intentionally including perforations, slits, holes or the like at the edges. One illustration is shown in FIG. 15 where a core layer comprises a central area 1510, transition regions 1516, 1518 and side edges 1520, 1522. Each of the side edges is shown as comprising a plurality of apertures to reduce the average basis weight at the edges 1520, 1522. For example, aperture 1552 is shown as being positioned at the edge 1520. In some instances, the apertures (or other open features) can be positioned at desired places along the edge to promote weakness in certain areas adjacent to side air bags or other structures. While two edges are shown in FIG. 15, a core layer comprising only a single edge of differing basis weight and with apertures may be present. Similarly, no transition zones or areas may be present if desired. The apertures shown in FIG. 15 are merely illustrative and different apertures may comprise different shapes and sizes. Further, the exact number of apertures present may vary and the edges 1520, 1522 need not have the same number of apertures. In general, the apertures provide open space, permit gases to flow through the core layer and can assist in proper air bag deployment. The presence of apertures can provide desirable attributes including, for example, the ability to produce a core layer with a substantially similar basis weight across the thickness of the core layer and then alteration of the basis weight at the edges by providing the apertures. Alternatively, as noted below, the apertures can be formed in an inline process during formation of the core layer without the need for any post-formation processing to form the apertures. The exact number of apertures present in the edges 1520, 1522 may vary, and the apertures may be replaced with, or used in combination with, slots, slits, perforations, etc.

Figure 16:
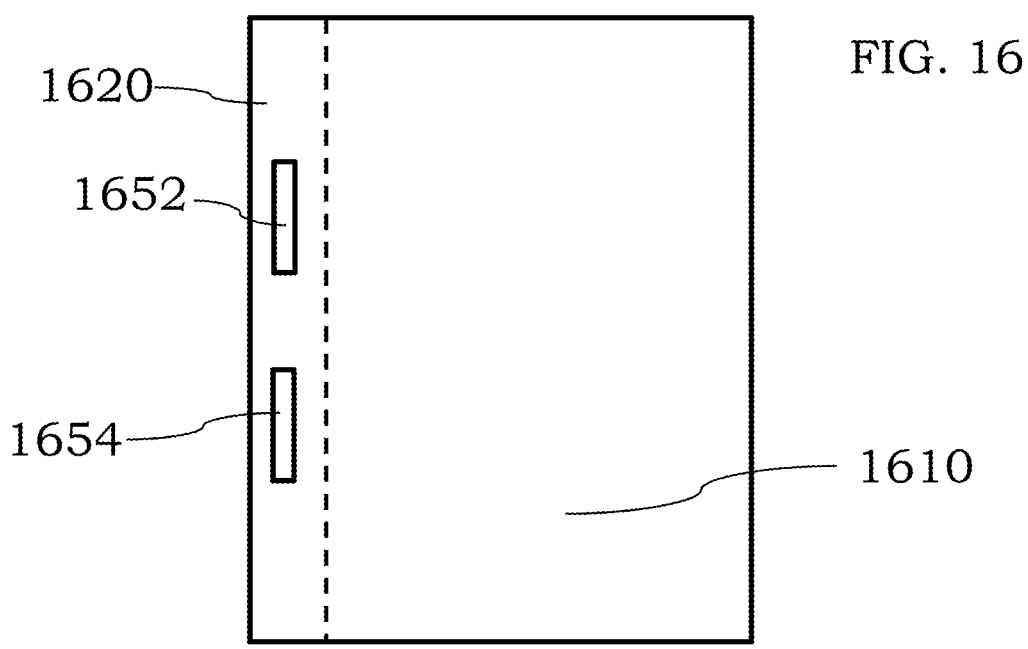
FIG. 16 is an illustration showing a core layer comprising slots at the edges, in accordance with some embodiments.

In another instance, one or more slots can be present in an edge of a core layer to provide an edge with an average basis weight that is lower than an average basis weight at a central area of the core layer. Referring to FIG. 16, a core layer is shown that comprise a central area 1610, an edge 1620 and slots 1652, 1654 in the edge 1620. The presence of the slots 1652, 1654 reduces the average basis weight at the edge 1620. The basis weight at the central area 1610 is generally higher than the average basis weight at the edge 1620. The exact number of slots present in the edge 1620 may vary, and the slots may be replaced with, or used in combination with, apertures, slits, perforations, etc.

In certain embodiments, the core layers described herein generally comprise one or more thermoplastic materials and one or more reinforcing fiber materials. The core layer may first be formed as a prepreg which is generally a precursor to the core layer and is not necessarily fully formed. For ease of illustration, a core layer is described below, though the properties of the core layer may also be the same as a prepreg. The core layer is a porous structure to permit gases to flow through the core layer. For example, the core layer may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core layer comprises a porosity or void content of greater than 0%, e.g., is not fully consolidated, up to about 95%. Unless otherwise stated, the reference to the core layer comprising a certain void content or porosity is based on the total volume of the core layer and not necessarily the total volume of the core layer plus any other materials or layers coupled to the core layer.

In some examples, a web formed from random crossing over of the reinforcing fibers held together by the thermoplastic material may be present in the core layer. A side view of one illustration of a core layer is shown in FIG. 17. The core layer 1700 generally comprises a planar layer that can be subjected to additional processing, e.g., molding, thermoforming, drawing, etc. to provide non-planar structures. The core layer 1700 may comprise a central area 1710 with a first average basis weight and an edge 1720 with a second average basis weight. In some examples, the first average basis weight is greater than the second average basis weight. While not wishing to be bound by any particular ranges, the first average basis weight may vary from around 500 gsm to about 2000 gsm, more particularly about 1000 gsm to about 1500 gsm. The second average basis weight may vary from around 400 gsm to about 1800 gsm, more particularly around 900 gsm to about 1500 gsm. If desired, an average basis weight at the edge 1720 may be at least 5% less than an average basis weight at the central area 1710, or an average basis weight at the edge 1720 may be least 10% less or at least 15% less or at least 20% less than an average basis weight at the central area 1710. The edge 1720 and the central area 1710 may comprise the same or different materials or one common material but a second different material, e.g., a common thermoplastic material but different reinforcing fibers. In some instances, the edge 1720 and the central area 1710 comprise the same materials but in differing amounts so the average basis weight of the edge 1720 is less than an average basis weight of the central area 1710. In other instances, the edge 1720 and the central area 1730 may comprise about the same amount of thermoplastic material and reinforcing fibers, but the central area can also comprise additional materials, e.g. lofting agents such as expandable microspheres, flame retardants, additional fibers, etc. to increase the overall average basis weight of the central area 1710. As described above, the basis weight of the edge 1720 may be substantially constant or may vary moving from the central area toward an outer portion of the edge 1720.

Figure 17A:
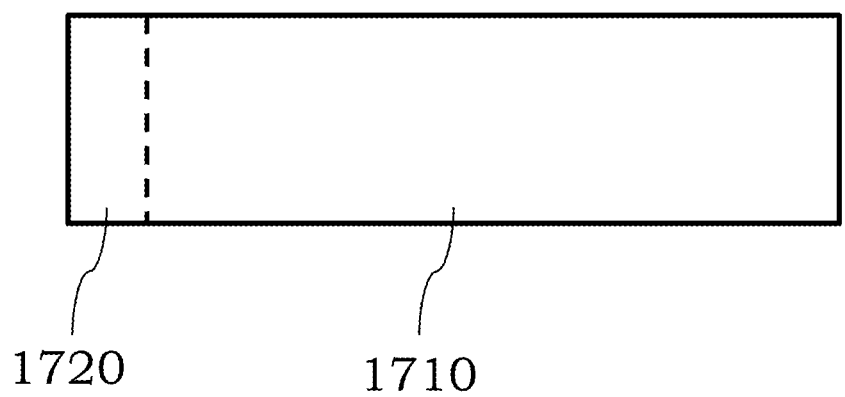
FIG. 17A is an illustration showing a core layer with an edge comprising a lower basis weight, in accordance with some examples.
Figure 17B:
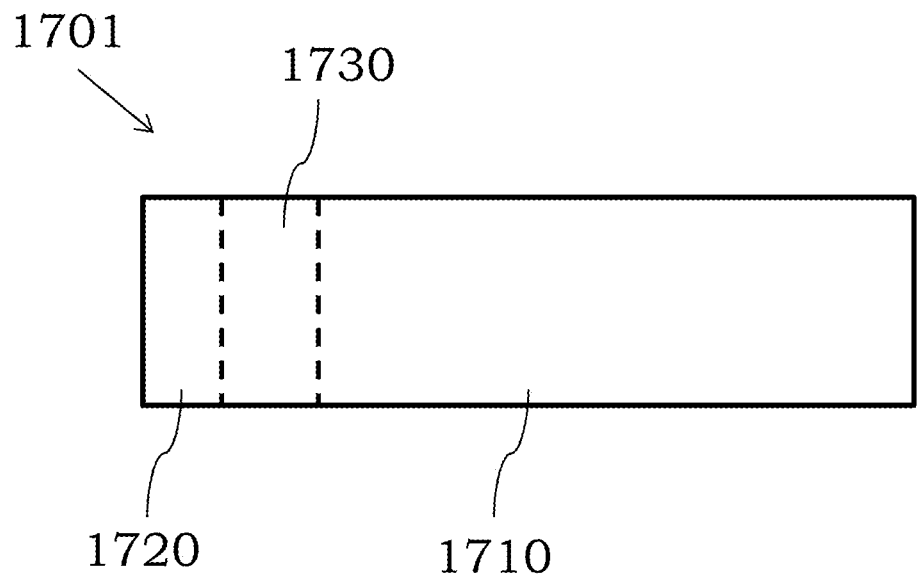
FIG. 17B is an illustration showing a core layer with a transition zone and an edge comprising a lower basis weight, in accordance with some examples.

In certain examples and referring to FIG. 17B, another illustration of a core layer 1800 is shown where the core layer 1702 comprises a central area 1710, an edge 1720 and a transition zone or region 1730 between the edge 1720 and the central area 1710. As noted herein, the transition zone or region 1730 may be present with a decreasing basis weight moving from the central area 1710 toward the edge 1710. An average basis weight of the edge 1720 may be substantially constant across the width of the edge 1720 or may be variable.

In certain embodiments, the thermoplastic material of the core layers described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the core layer can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the core layer can vary and illustrative amounts range from about 20% by weight to about 80% by weight. In some instances, the thermoplastic material loading rate may be lower at an edge or edges of the core layer to provide a lower basis weight at the edge or edges of the core layer.

In certain examples, the reinforcing fibers of the core layer described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers. The total fiber content in the core layer may be from about 20% to about 90% by weight of the core layer, more particularly from about 30% to about 70%, by weight of the core layer. Typically, the fiber content of a composite article comprising the core layer varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting core layer. Suitable additional types of fibers, fiber sizes and amounts will be readily selected by the person of ordinary skill in the art, given the benefit of this disclosure. In one non-limiting illustration, fibers dispersed within a thermoplastic material to provide a core layer generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the core layer may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices. In some instances, the reinforcing fiber loading rate may be lower at an end or edges of the core layer to provide a lower basis weight at the edge or the edges.

In some configurations, the core layer may be a substantially halogen free or halogen free layer to meet the restrictions on hazardous substances requirements for certain applications. In other instances, the core layer may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the core layers may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 40 weight percent (based on the weight of the prepreg), more particularly about 0.1 weight percent to about 15 weight percent, e.g., about 5 weight percent to about 15 weight percent. If desired, two different halogenated flame retardants may be added to the core layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the core layer. If desired, two different substantially halogen free flame retardants may be added to the core layers. In certain instances, the core layers described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 5 weight percent to about 40 weight percent, e.g., about 2 weight percent to about 14 weight percent based on the weight of the core layer. The flame retardant agents used in the core layers described herein can be added to the mixture comprising the thermoplastic material and fibers (prior to disposal of the mixture on a wire screen or other processing component) or can be added after the core layer is formed.

Figure 17C:
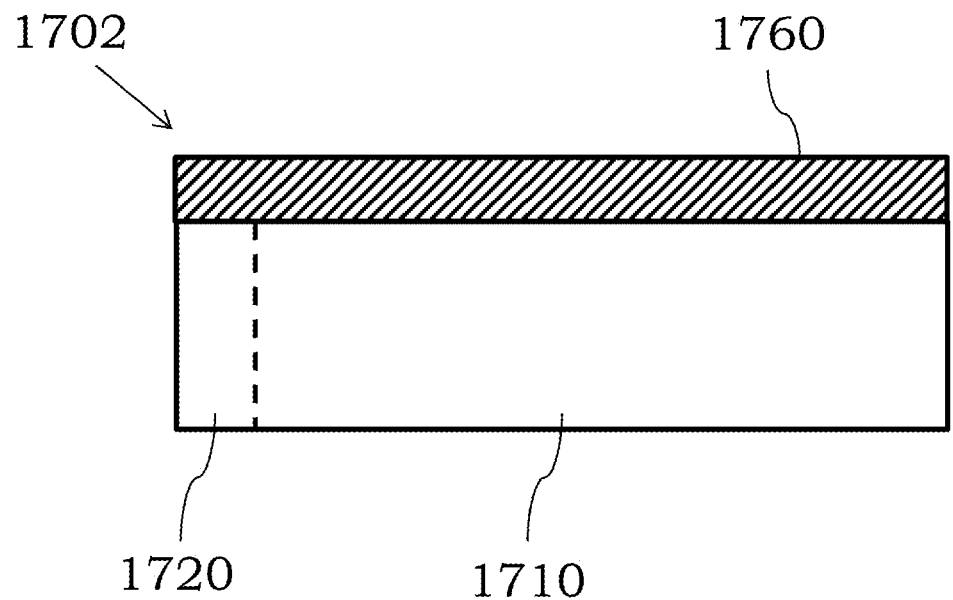
FIG. 17C is an illustration of a composite article comprising a core layer and a skin layer disposed on the core layer, in accordance with certain examples.

In some examples, a composite article can be formed using the core layer by disposing a skin layer on one or more surfaces of the core layer. Referring to FIG. 17C, a composite article 1702 is shown that comprises a skin layer 1760 disposed on a core layer comprising a central area 1710 and an edge 1720. For example, the layer 1760 may comprise, for example, a scrim (e.g., fiber based scrim), a foil, a woven fabric, a non-woven fabric or be present as an inorganic coating, an organic coating, or a thermoset coating disposed on the core layer. In other instances, the layer 1760 may comprise a limiting oxygen index greater than about 22, as measured per ISO 4589 dated 1996. Where a fiber based scrim is present as (or as part of) the layer 1760, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 1760, the coating may comprise at least one of unsaturated polyurethanes, vinyl esters, phenolics and epoxies. Where an inorganic coating is present as (or as part of) the layer 1760, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 1760, the non-woven fabric may comprise a thermoplastic material, a thermal setting binder, inorganic fibers, metal fibers, metallized inorganic fibers and metallized synthetic fibers. If desired, an intermediate layer (not shown) can be present between the core layer and the skin layer 1760.

Figure 17D:
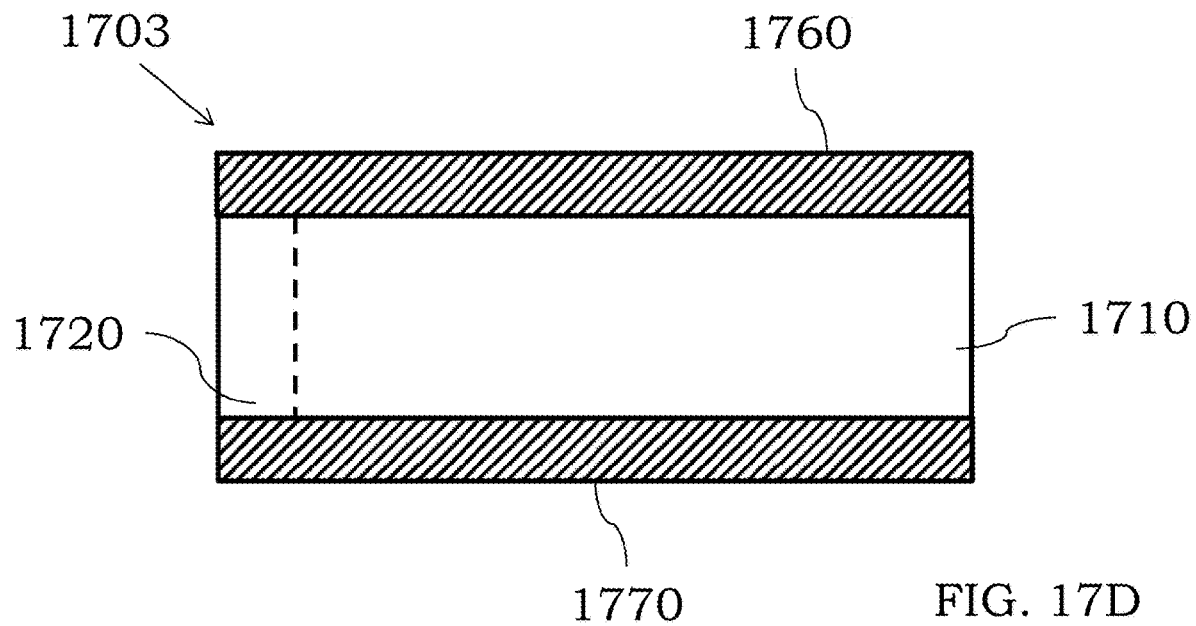
FIG. 17D is an illustration of a composite article comprising a core layer and two skin layers disposed on the core layer, in accordance with certain examples.
Figure 17E:
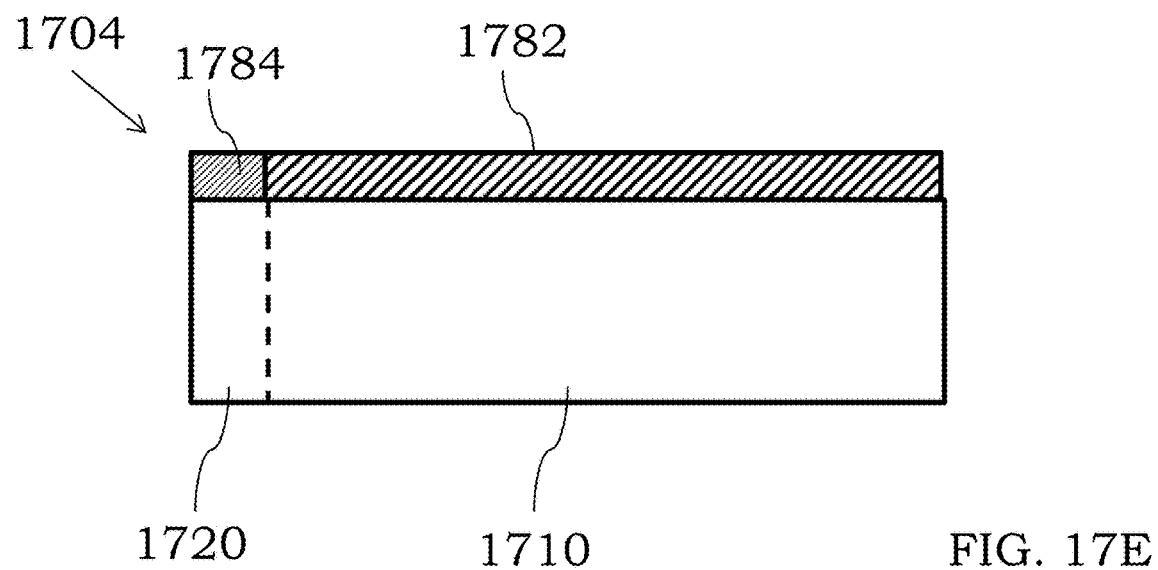
FIG. 17E is an illustration of a composite article comprising a core layer and a skin layer with a variable basis weight disposed on the core layer, in accordance with certain examples.

In some examples, a composite article may also comprise a second skin layer disposed on another surface of a core layer. Referring to FIG. 17D, a composite article 1703 is shown comprising skin layers 1760, 1770. The layer 1770 may be the same or may be different than the layer 1760. In some instances, the layer 1770 may comprise, for example, a scrim (e.g., fiber based scrim), a foil, a woven fabric, a non-woven fabric or be present as an inorganic coating, an organic coating, or a thermoset coating disposed on the core layer. In other instances, the layer 1770 may comprise a limiting oxygen index greater than about 22, as measured per ISO 4589 dated 1996. Where a fiber based scrim is present as (or as part of) the layer 1770, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 1770, the coating may comprise at least one of unsaturated polyurethanes, vinyl esters, phenolics and epoxies. Where an inorganic coating is present as (or as part of) the layer 1770, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 1770, the non-woven fabric may comprise a thermoplastic material, a thermal setting binder, inorganic fibers, metal fibers, metallized inorganic fibers and metallized synthetic fibers. If desired, an intermediate layer (not shown) can be present between the core layer and the skin layer 1770.

In certain embodiments, the skin layers present in the composite articles described herein may also comprise a variable basis weight. For example and referring to FIG. 17E, a composite article 1704 is shown that comprises a skin layer with areas 1782, 1784 of a different basis weight. In certain instances, an average basis weight of the area 1784 can be less than an average basis weight of the area 1782 to assist in proper air bag deployment. While not shown, another skin layer with a variable basis weight can be present on an opposite surface of the core layer shown in FIG. 17E if desired. The basis weight at the area 1784 may be, for example, at least 5% less, at least 10% less or at least 20% less than an average basis weight of the area 1782.

Figure 17F:
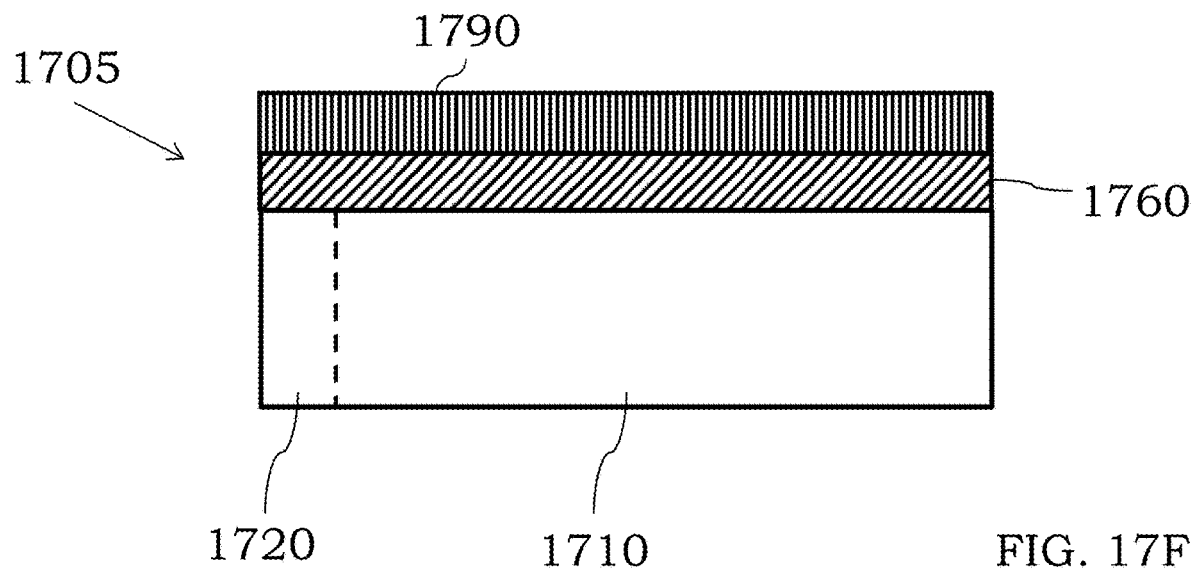
FIG. 17F is an illustration of a composite article comprising a core layer a skin layer disposed on the core layer and a decorative layer disposed on the skin layer, in accordance with certain examples.

In some examples, the composite articles described herein may comprise an additional layer disposed one or more of the skin layers. Referring to FIG. 17F, a composite article is shown comprising an additional layer 1790 disposed on the skin layer 1760. The additional layer 1790 may be another skin layer or may comprise different layers or materials. For example, the decorative layer 1790 may be configured as a decorative layer, textured layer, colored layer and the like. For example, a decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, melt-blown, wet-laid, and/or dry-laid processes. Insulation or sound absorption layers may also be bonded to one or more surfaces of the articles described herein, and the insulation or sound absorption layers may be open or closed, e.g., an open cell foam or a closed cell foam, as desired.

In certain embodiments, the core layers and/or articles described herein can be generally prepared using the reinforcing fibers and a thermoplastic material optionally in combination with a flame retardant material or other materials. To produce the core layer, a thermoplastic material, reinforcing fibers and optionally other materials can be added or metered into a dispersing foam contained in an open top mixing tank fitted with an impeller. Without wishing to be bound by any particular theory, the presence of trapped pockets of air of the foam can assist in dispersing the reinforcing fibers, the thermoplastic material and any other materials. In some examples, the dispersed mixture of fibers and thermoplastic can be pumped to a head-box located above a wire section of a paper machine via a distribution manifold. The foam, not the fibers, or thermoplastic, can then be removed as the dispersed mixture is provided to a moving support such as a wire screen using a pressure, continuously producing a uniform, fibrous wet web. As discussed in more detail below, in some instances the exact configuration of the moving support and/or the pressure used can be selected to provide a core layer with a variable basis weight. The wet web can be passed through a dryer at a suitable temperature to reduce moisture content and to melt or soften the thermoplastic material. When the hot web exits the dryer, a surface layer such as, for example, a textured film may be laminated onto the web by passing the web of reinforcing fiber, thermoplastic material and textured film through the nip of a set of heated rollers. If desired, additional layers such as, for example, another film layer, scrim layer, etc. may also be attached along with the textured film to one side or to both sides of the web to facilitate ease of handling the produced composite. The composite can then be passed through tension rolls and continuously cut (guillotined) into the desired size for later forming into an end composite article. Further information concerning the preparation of such composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 18:
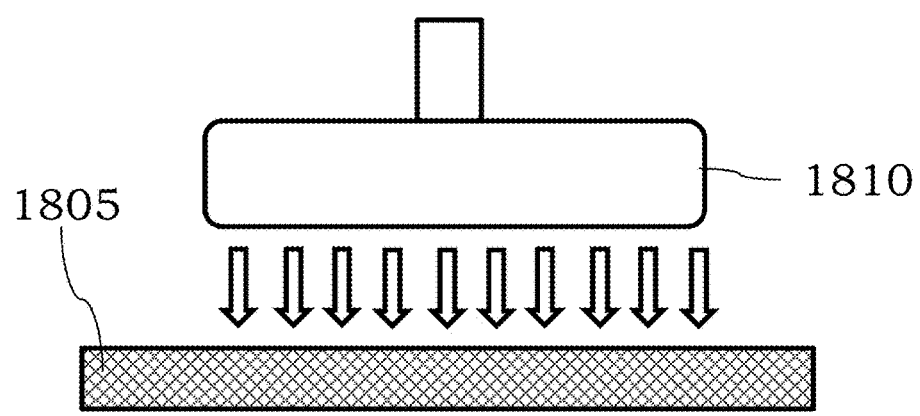
FIG. 18 shows part of a system comprising a pressure head, in accordance with some examples.

In some embodiments, a positive pressure can be provided to certain areas of the moving support to force out the foam from certain areas of the moving support to leave behind increased amounts of reinforcing fibers and/or thermoplastic material. An illustration is shown in FIG. 18 where an air head 1810 is shown positioned above a portion of a support element 1805. The air head 1810 can be fluidically coupled to an air source, e.g., ambient air, an inert gas such a nitrogen or carbon dioxide, etc. to provide a positive pressure to a surface of the moving support 1805. A plurality of different air nozzles or jets may be present in the air head 1810 to provide the air to the surface of the support 1805. The edges of the moving support generally do not receive any air and have increased amounts of foam or liquid occupying the volume of the moving support 1805. When the core layer is dried to remove the foam or liquid, the amount of reinforcing fibers and/or thermoplastic material remaining at the edges is generally lower than what is present at the central area of the core layer. The exact positive pressure provided to the moving support 1805 may vary, for example, from about 1 to 10 psi. Generally, the positive pressure is high enough to force out some foam and/or liquid from the moving support 1805 but not so high to force out or displace the reinforcing fibers and/or thermoplastic materials from the moving support 1805. If desired, a positive pressure can be provided to the entire surface of the moving support, but the positive pressure may be higher at the central areas than at the edges. In addition, a transition region or zone may result in the core layer adjacent to the edges of the air head 1810 as some positive pressure is provided at the edges of the air head 1810 but not as much positive pressure as at the central region of the air head 1810. If desired, different pressures can be provided across the width of the air head 1810.

Figure 19:
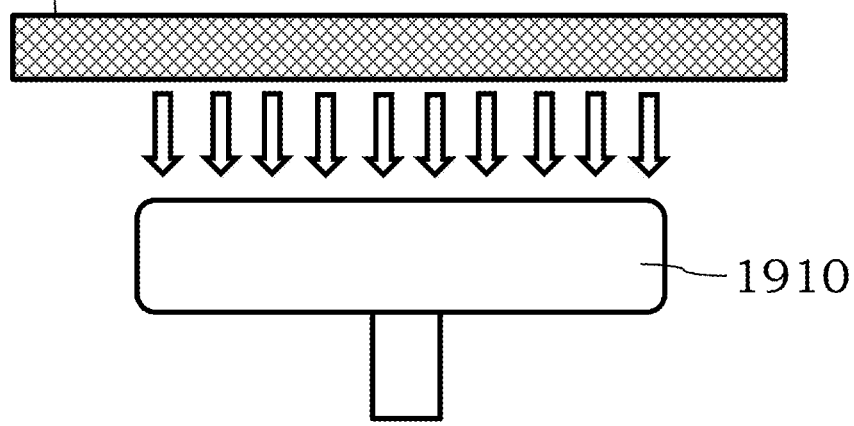
FIG. 19 shows part of a system comprising a vacuum head, in accordance with some examples.

In some examples, a negative pressure can be provided to certain areas of the moving support to draw out the foam from certain areas of the moving support to leave behind increased amounts of reinforcing fibers and/or thermoplastic material. An illustration is shown in FIG. 19 where a vacuum head 1910 is shown positioned above a portion of a support element 1905. The vacuum head 1910 can be fluidically coupled to a pump to provide a negative pressure to a surface of the moving support 1905. A plurality of different ports may be present in the vacuum head 1810 to draw air and/or liquid from the surface of the support 1905. The edges of the moving support 1905 generally do not receive any vacuum pressure and have increased amounts of foam or liquid occupying the volume of the moving support 1905. When the core layer is dried to remove the foam or liquid, the amount of reinforcing fibers and/or thermoplastic material remaining at the edges is generally lower than what is present at the central area of the core layer. The exact negative pressure provided to the moving support 1905 may vary, for example, from about 1 to 10 psi of vacuum pressure. Generally, the negative pressure is high enough to draw out some foam and/or liquid from the moving support 1905 but not so high to draw out or remove the reinforcing fibers and/or thermoplastic materials from the moving support 1905. If desired, a negative pressure can be provided to the entire surface of the moving support, but the negative pressure may be greater at the central areas than at the edges. In addition, a transition region or zone may result in the core layer adjacent to the edges of the vacuum head 1910 as some negative pressure is provided at the edges of the vacuum head 1910 but not as much negative pressure as at the central region of the vacuum head 1910. If desired, different pressures can be provided across the width of the vacuum head 1910.

Figure 20:
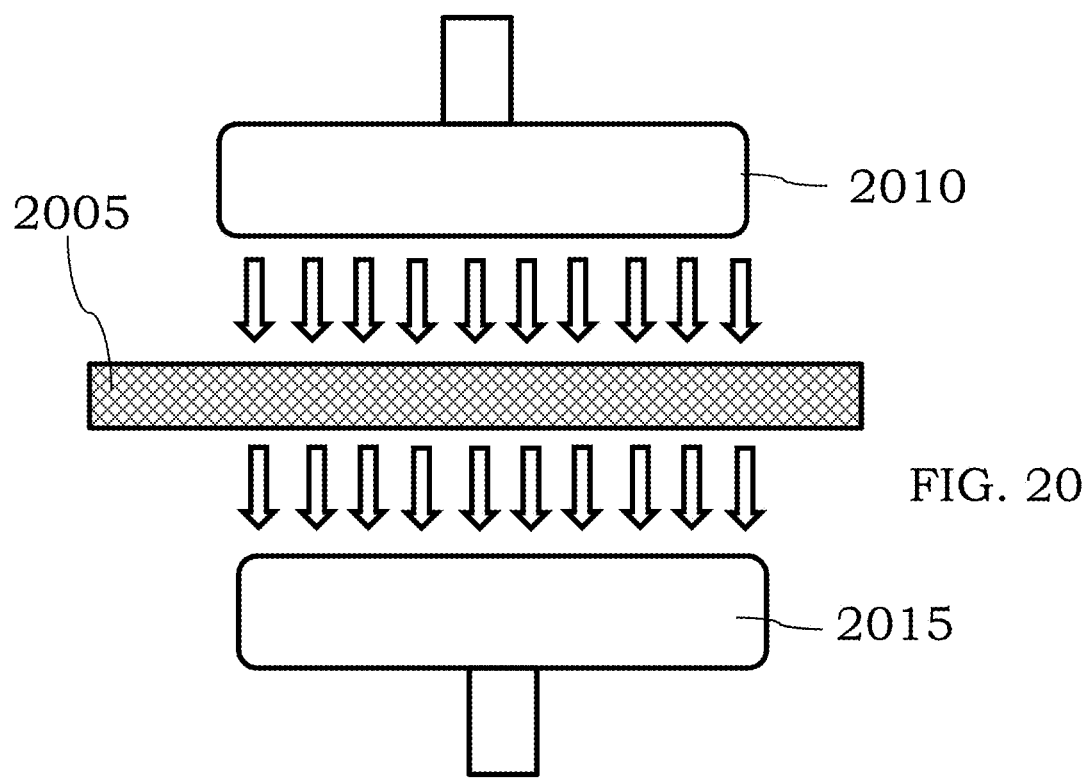
FIG. 20 shows part of a system comprising a vacuum head and a pressure head, in accordance with some examples.

In some examples, both a positive pressure and a negative pressure can be used to provide a core layer. Referring to FIG. 20, a system is shown that includes a moving support 2005, an air head 2010 and a vacuum head 2015. The air head 2010 can be configured to provide a positive pressure to a dispersion of thermoplastic material and reinforcing fibers on the moving support 2005 to force foam and/or liquid out of the dispersion. The vacuum head 2015 can be configured to provide a negative pressure to the dispersion of thermoplastic material and reinforcing fibers on the moving support 2005 to draw out foam and/or liquid from of the dispersion. The resulting core layer generally comprises a higher basis weight at areas adjacent to the air head 2010 and the vacuum head 2015 than at the edges of the core layer. The exact absolute pressures provided by the air head 2010 and the vacuum head 2015 can be the same or can be different. In some examples, a greater negative pressure is provided than the provided positive pressure. In other examples, a greater positive pressure is provided than the provided negative pressure. In additional examples, the absolute pressure provided by the air head 2010 and the vacuum head 2015 may be about the same.

Figure 21:
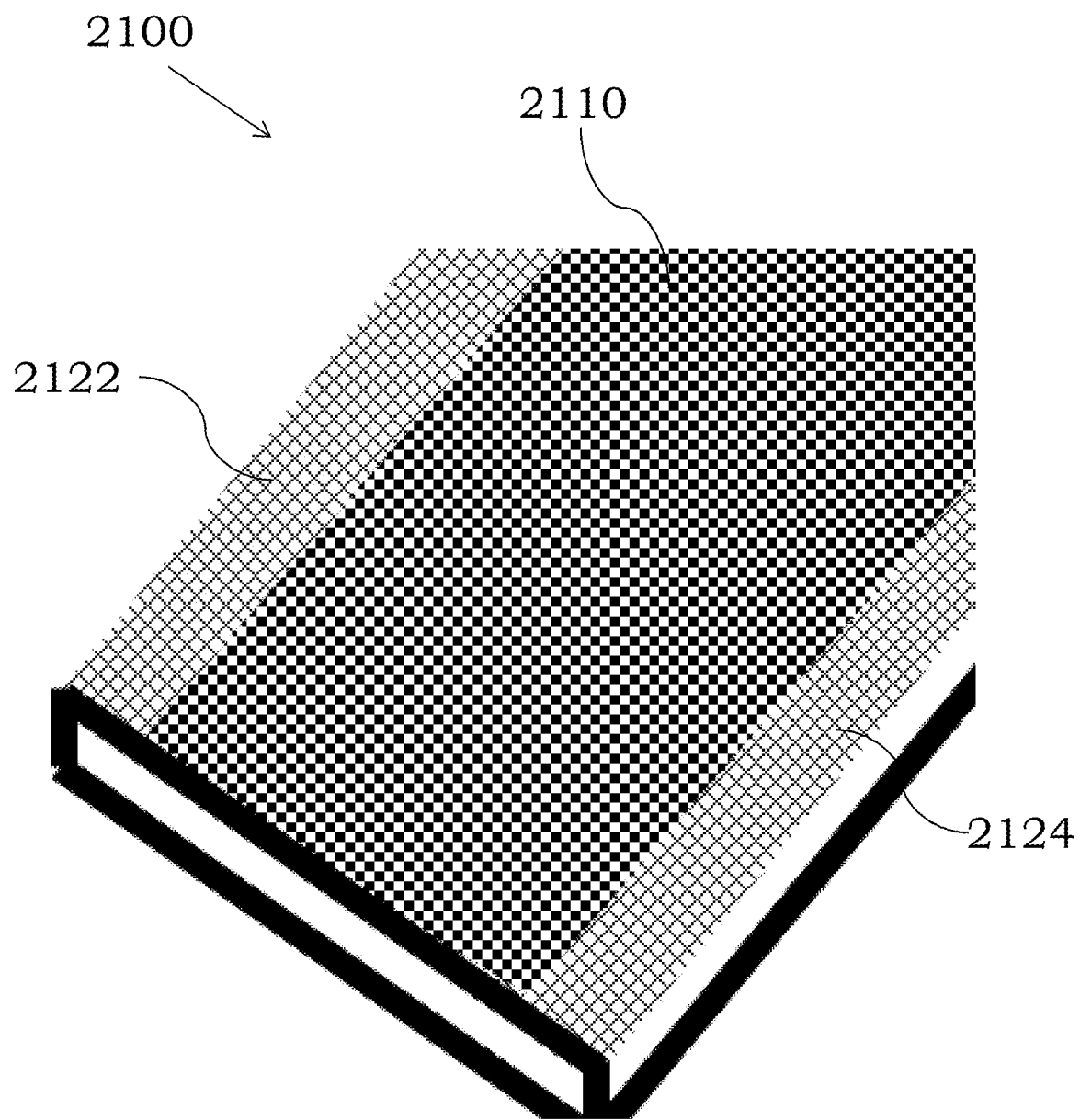
FIG. 21 is an illustration of a support element that can be used to produce a prepreg, in accordance with some embodiments.

In certain embodiments, it may be desirable to use a moving support that is configured with different features, e.g., differently sized openings, different materials, etc., to provide a core layer with a variable basis weight across the width of the core layer. Referring to FIG. 21, a moving support 2100 configured as a wire screen is shown. The wire screen is configured differently at different areas 2110, 2122 and 2124. For example, the openings between wires of the screen may be smaller (on average) at area 2110 to assist in retaining more reinforcing fibers and/or thermoplastic material at the area 2110 than at the areas 2122, 2124. By selecting a mesh size of the areas 2122, 2124 to on average be greater than a mesh size 2110, lesser amounts of reinforcing fiber and/or thermoplastic material can be retained at the edges 2122, 2124 of the moving support 2100. When the foam and/or any liquid is removed from the dispersion remaining on the moving support 2100, an average basis weight at a central area of the core layer can be higher than an average basis weight at the edges.

Figure 22:
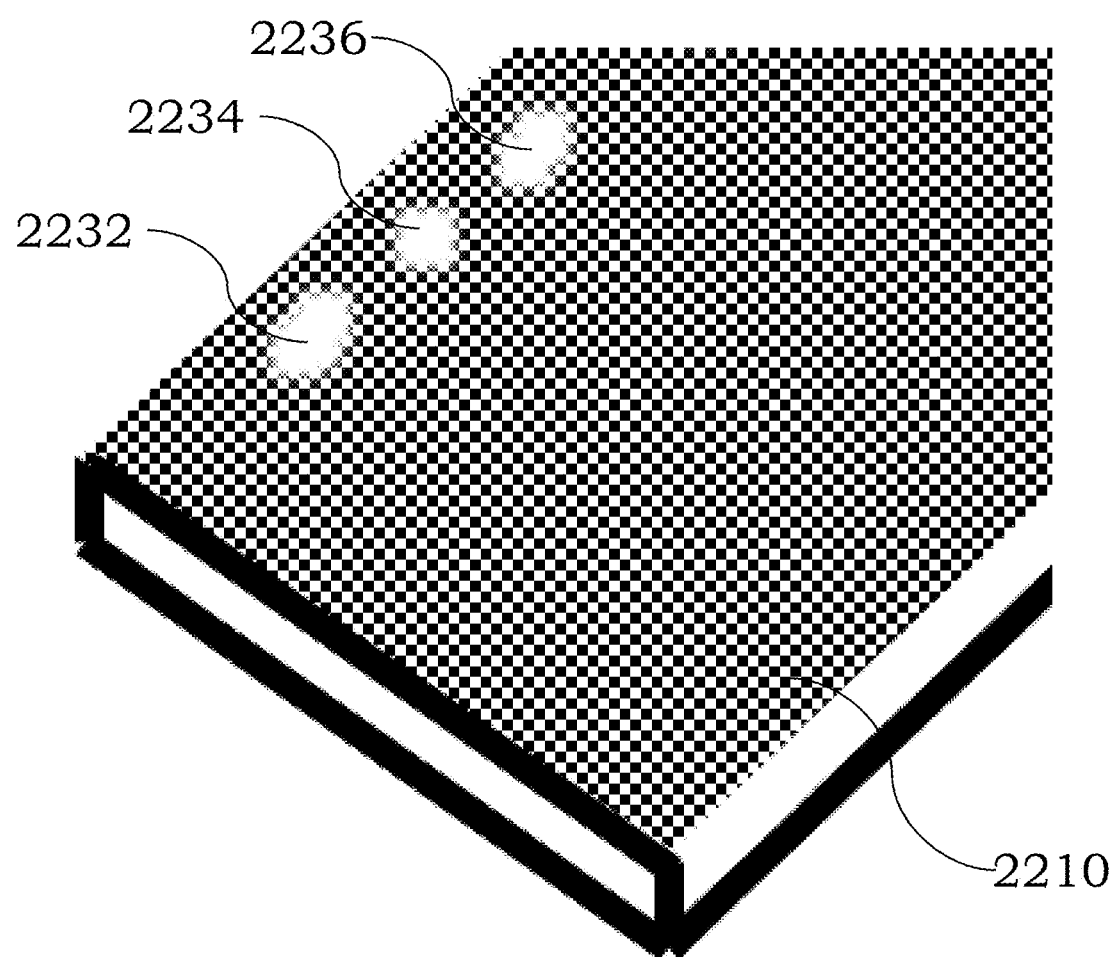
FIG. 22 is another illustration of a support element that can be used to produce a prepreg, in accordance with some embodiments.

In other configurations, the moving support may comprise one or more open areas that are designed to not retain any dispersion of reinforcing fibers and/or thermoplastic materials. One illustration is shown in FIG. 22. A moving support 2210 configured as a wire screen with substantially the same mesh size comprises open areas 2232, 2234 and 2236 at edges of the moving support 2210. The open areas 2232, 2234 and 2236 generally are sized and arranged such that little or no dispersion remains in the open areas 2232, 2234 and 2236 during formation of the core layer. The presence of the open areas 2232, 2234 and 2236 generally results in a core layer with an average basis weight at an edge which is lower than an average basis weight at the center of the core layer. Alternatively, the moving support may not have any open areas and openings can be formed, e.g., drilled, cut, etched, etc. at the edge to reduce an average basis weight at the edge.

Figure 23:
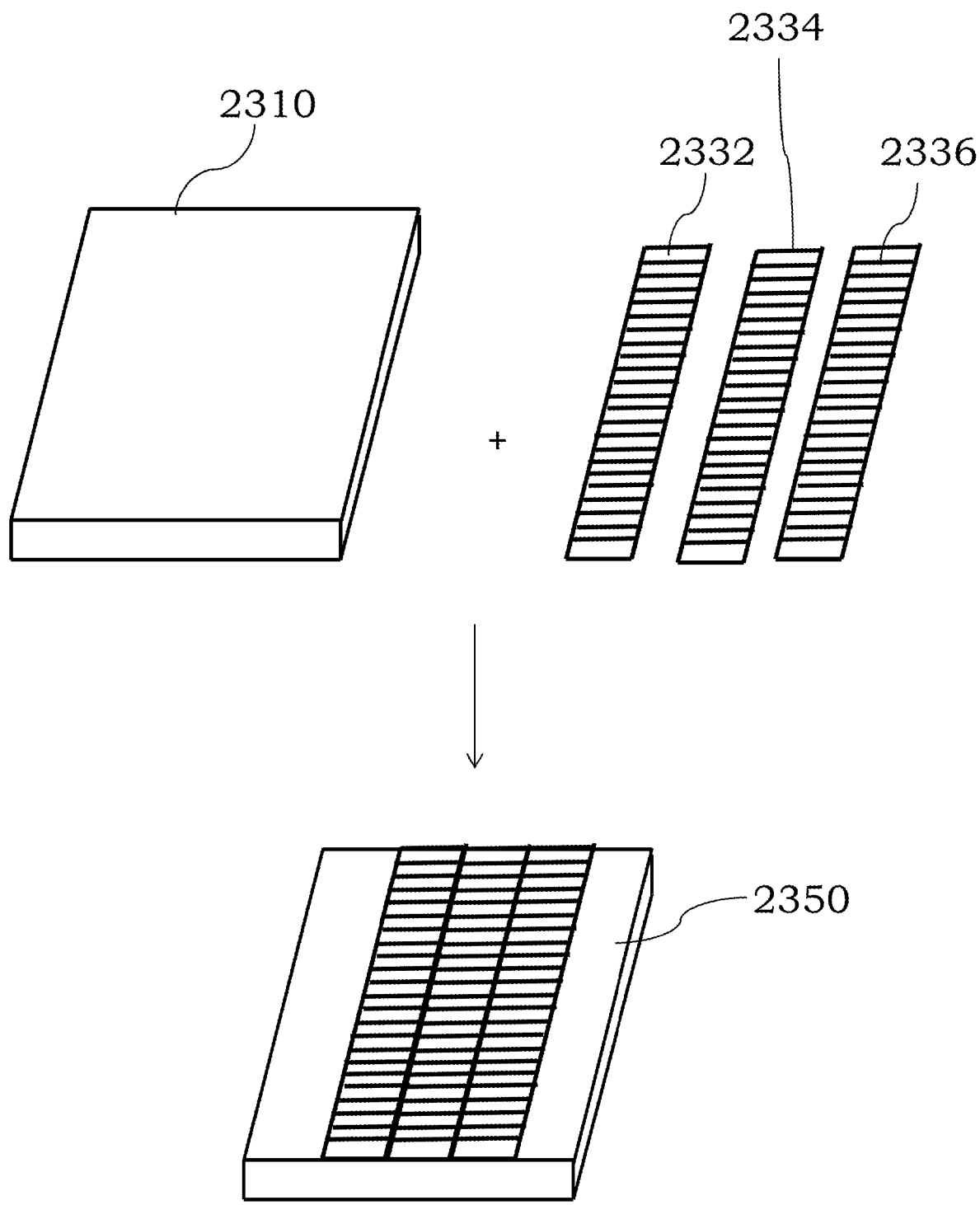
FIG. 23 schematically shows a process of placing strips of material at a central area to provide a core layer with a variable basis weight, in accordance with some examples.

In certain embodiments, when forming a core layer, strips of material can be added to the central areas to increase an overall basis weight at those areas. The strips can be disposed during formation of the prepreg. Referring to FIG. 23, a process is schematically shown where strips 2332, 2334, 2336 of reinforcing fibers are added to a core layer 2310 to provide a core layer 2350. By adding the strips 2332, 2334, 2336, the average basis weight at a central area of the core layer 2350 is greater than an average basis weight at edges of the core layer 2350.

In other instances, a mask or template can be used to selectively guide deposition of the dispersion into the moving support. For example, a mask can be deposited on an outer edge of the moving support to shield these areas from receiving the dispersion and/or to reduce the amount of material which can be loaded into the moving support for at least some period. The mask can then be removed prior to further processing of the core layer to provide a core layer with a lower basis weight at the edges than at a central area.

Figure 24:
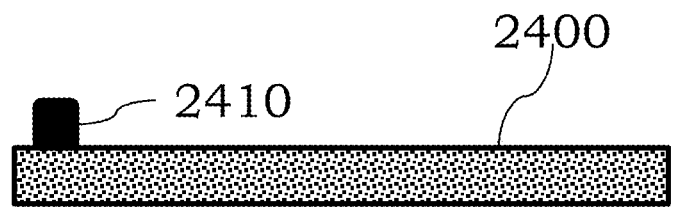
FIG. 24 is a side view of a support element with a boss, in accordance with some embodiments.

In some examples, the moving support itself may comprise bosses or projections which are designed to prevent substantially any material from being deposited at the area of the bosses or projections. Referring to FIG. 24, a side view of a support element 2400 comprising a boss 2410 that projects from a surface of the support element 2400. The boss 2410 is generally non-porous so thermoplastic material and/or reinforcing fibers do not end up at the position of the boss 2410 in the final formed prepreg or core layer. The boss 2410 is designed so open space is present at edges of the prepreg or core layer to reduce an average basis weight at the edges. Two more bosses or other features may be present on the support element 2400 and positioned as desired.

Figure 25:
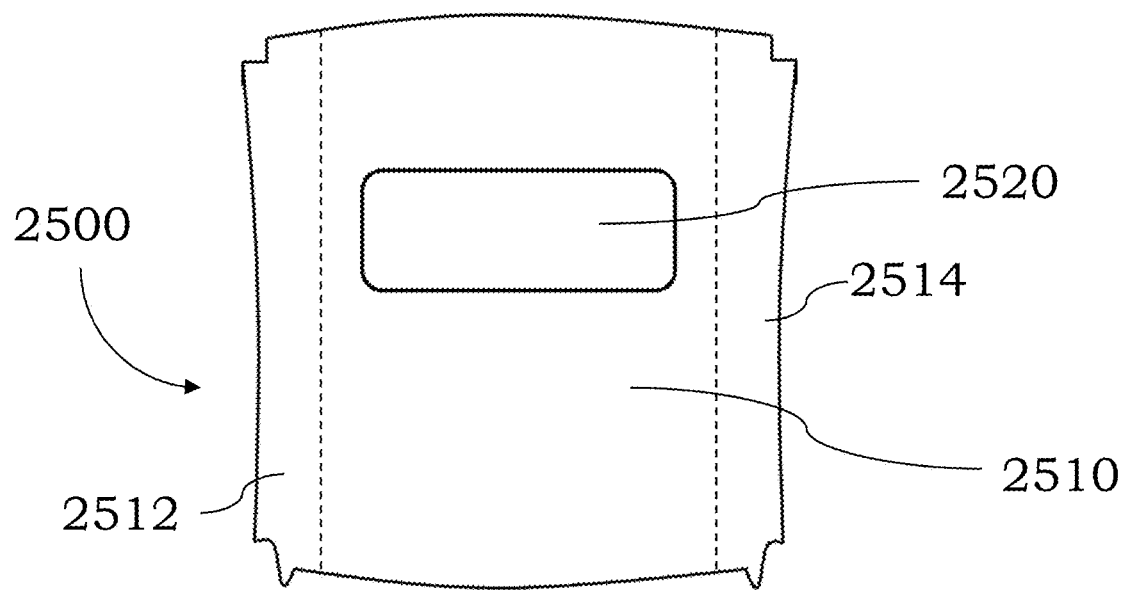
FIG. 25 is an illustration of an automotive headliner, in accordance with certain embodiments.

In certain examples, the core layers described herein can be used in composite articles configured for interior uses in automotive vehicles such as cars, buses, trucks, etc. One illustration (top view) of an automotive headliner is shown in FIG. 25. The headliner 2500 comprises a body 2510 and an optional opening 2520, e.g., for a sunroof, moonroof, etc. The body of the headliner 2510 can be produced by initially heating a core layer as described herein to a desired temperature in an oven, e.g., about 210-230° C., and then moving to a molding machine where a decorative fabric can be placed on the core layer and pressed with the desired mold to convert the article into a headliner. The opening 2520 may then be provided by trimming the headliner 2500. The non-visible surface of the headliner, e.g., the surface which rests against the roof of the vehicle may comprise one or more additional layers or an adhesive as desired. In addition, the non-visible surface may also comprise its own skin layer, decorative layer, etc. which can function, at least some degree, as an adhesive. The overall shape and geometry of the headliner 2500 may be selected based on the area of the vehicle which the headliner is to be coupled. For example, the length of the headliner 2500 can be sized and arranged so it spans from the front windshield to the rear windshield, and the width of the headliner 2500 can be sized and arranged so it spans from the left side of the vehicle to the right side of the vehicle. In some examples, edges 2512, 2514 may comprise a lower basis weight than a central area of the body 2510 to permit proper side air bag deployment, e.g., to permit failure of the headliner at the edges 2512, 2514 when side air bags are deployed.

Certain specific examples are described below to illustrate some of the features and aspects of the technology.

Example 1

Figure 26:
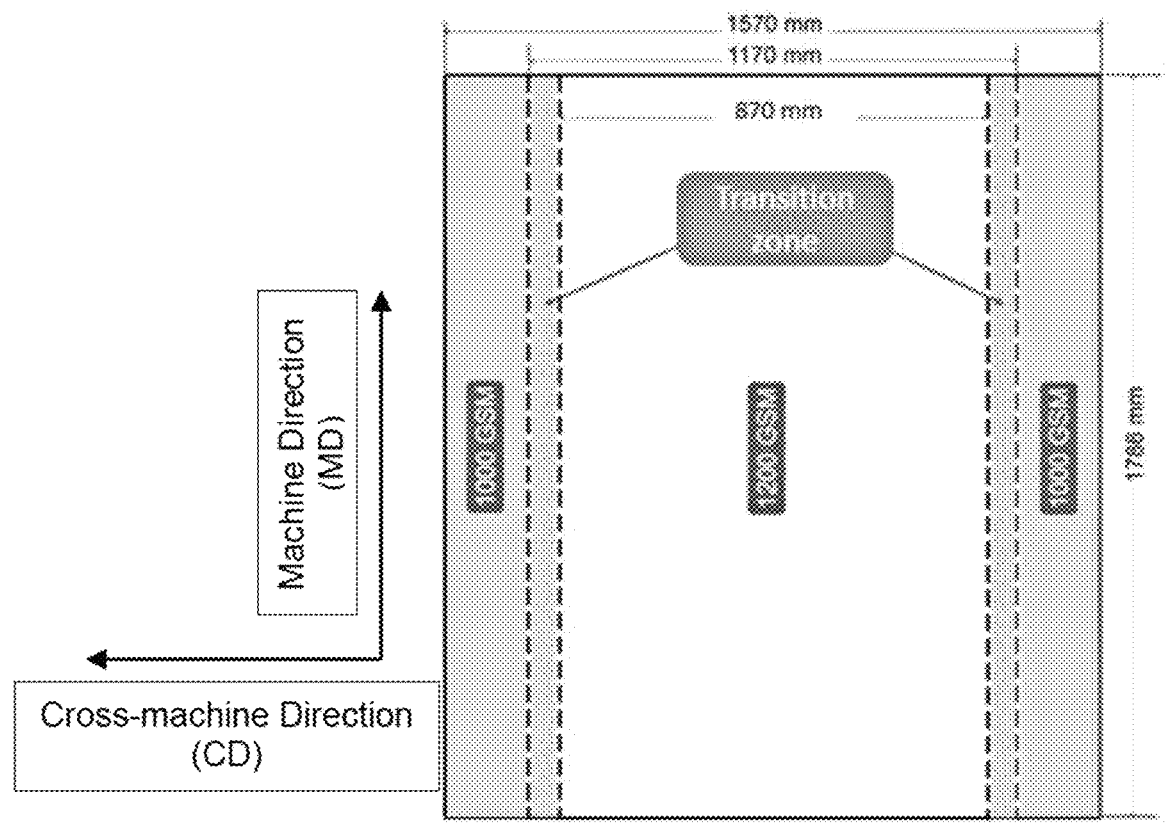
FIG. 26 is an illustration showing a core layer with transition zones and edges, in accordance with some embodiments.

A LWRT core layer was produced using glass fibers and polypropylene in a wet lay method. The LWRT material core was sandwiched by two skin layers. The core material basis weight was varied in the cross-machine direction, with a target basis weight on both edges around 1000 gsm and a heavier basis weight around 1200 gsm the center part. The sheet layout is demonstrated in FIG. 26. Following production, the sheets were heated and molded in a press to achieve a desired thickness, e.g., typically around 2.5 mm.

Example 2

Figure 27:
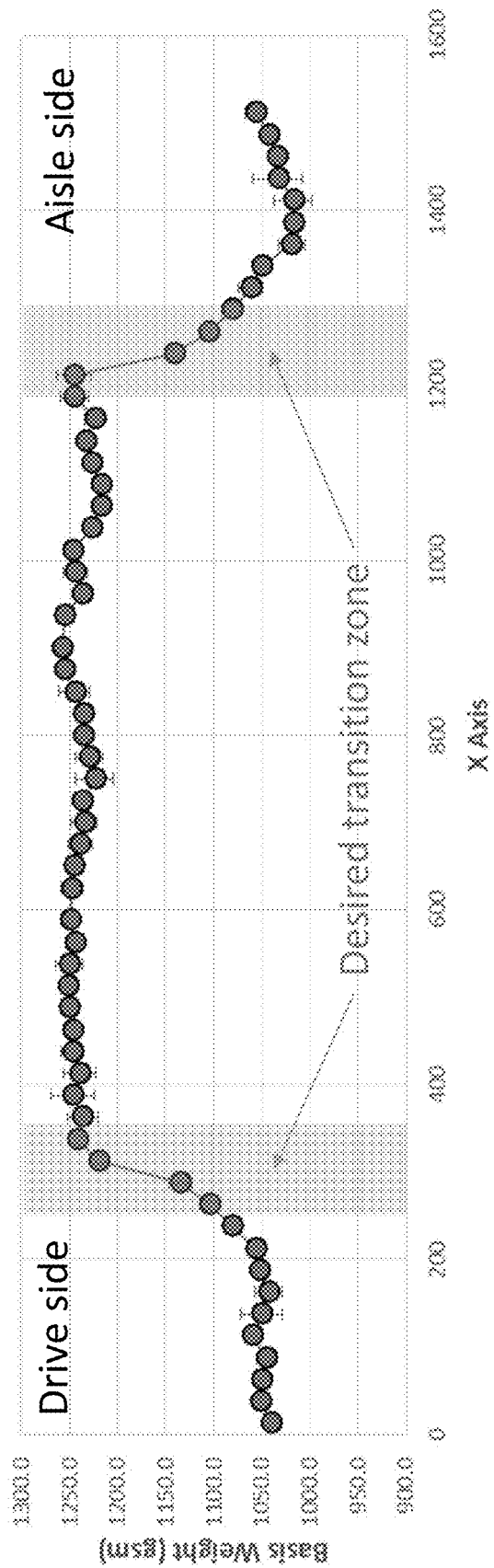
FIG. 27 is a graph showing the basis weight across a width of the core layer, in accordance with some examples.

The basis weight over the width of the board, e.g., in the cross direction, of the composite article of Example 1 was measured. The cross direction dimension across the board was about 1524 mm. Each transition zone had a cross-direction width of about 100 mm. The "0" distance was the left edge of the composite article. As can be seen in FIG. 27, the basis weight increases from the left edge through the transition zone and then levels off at the central area. The basis weight then decreases again approaching the right edge of the composite article.

Example 3

Figure 28:
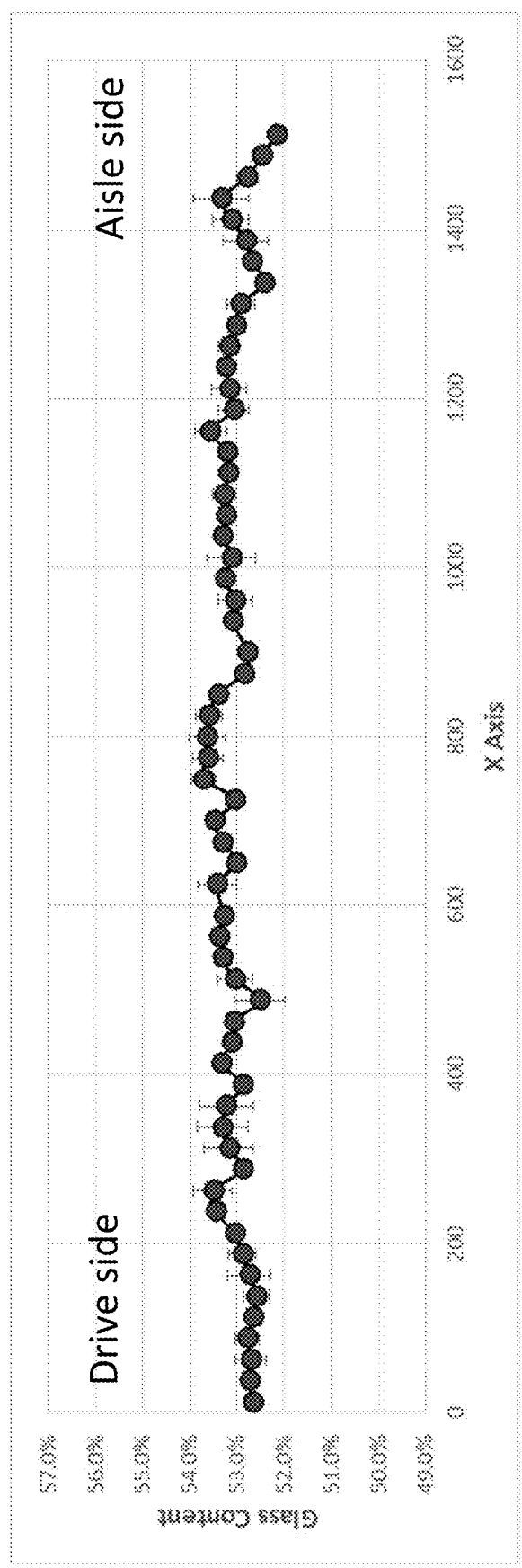
FIG. 28 is a graph showing the glass content across a width of the core layer, in accordance with some examples.

The glass content across the width of the board was also measured. FIG. 28 is a graph showing the results. The "0" distance was the left edge of the composite article. The glass content increases only slightly toward the central area of the board compared to the edges. The lower glass content at the edges is believed to be due to the lower glass content in the two skin layers and not any substantial difference in glass content across the core layer.

Example 4

The molded sheets were cut into certain dimensions according to ASTM D790 method, e.g., ASTM D790-17 method. The molding thickness was around 2.5 mm.

Figure 29:
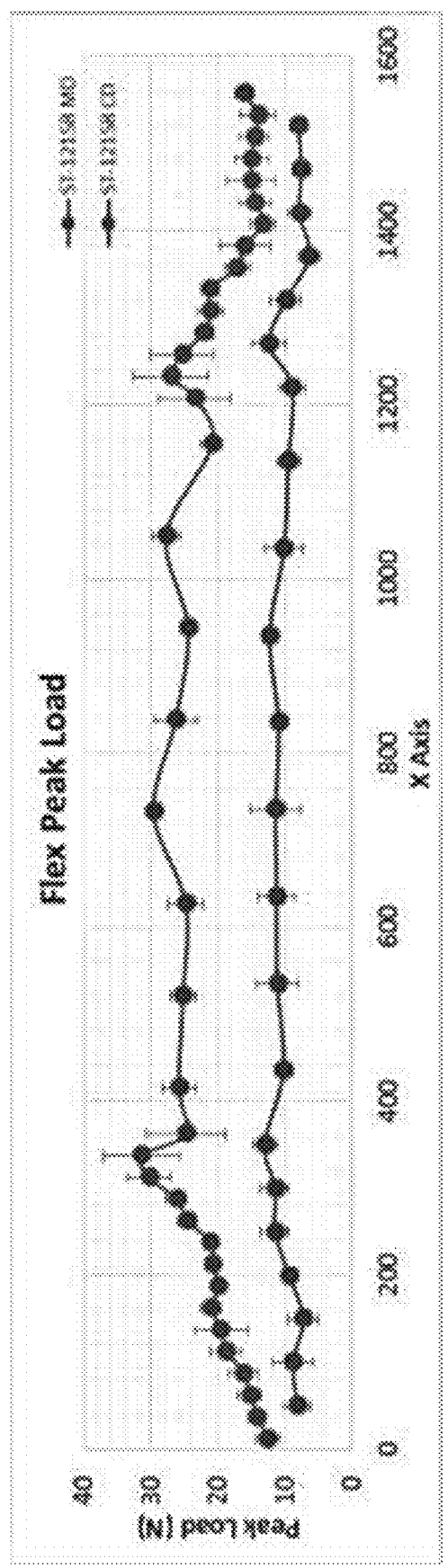
FIG. 29 is an graph showing peak load across a width of the core layer, in accordance with certain examples.
Figure 30:
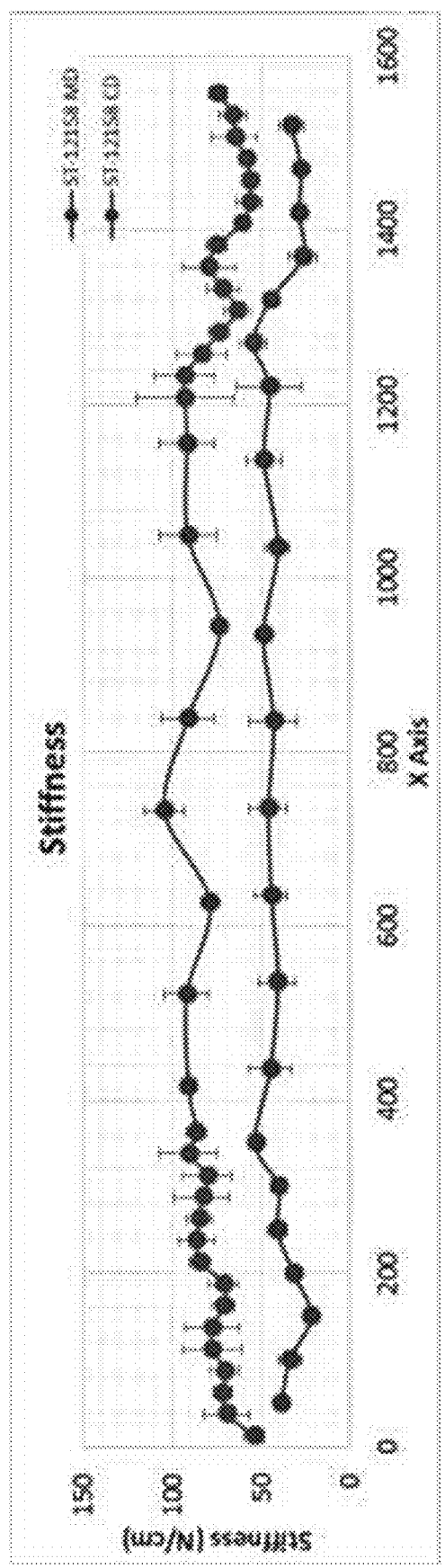
FIG. 30 is an graph showing stiffness across a width of the core layer, in accordance with certain examples.

FIGS. 29 and 30 show the flexural peak load and stiffness of the molded samples. The specimens for mechanical tests cut along the MD direction were shown in blue dots (top line in each of FIGS. 29 and 30), and the specimens cut long the CD direction were shown in red dots (bottom line in each of FIGS. 29 and 30). FIG. 29 is consistent with the flexural peak load of this type LWRT material in the center being higher than that at the edges. FIG. 30 shows a similar trend for stiffness of the molded samples.

Example 5

Figure 31:
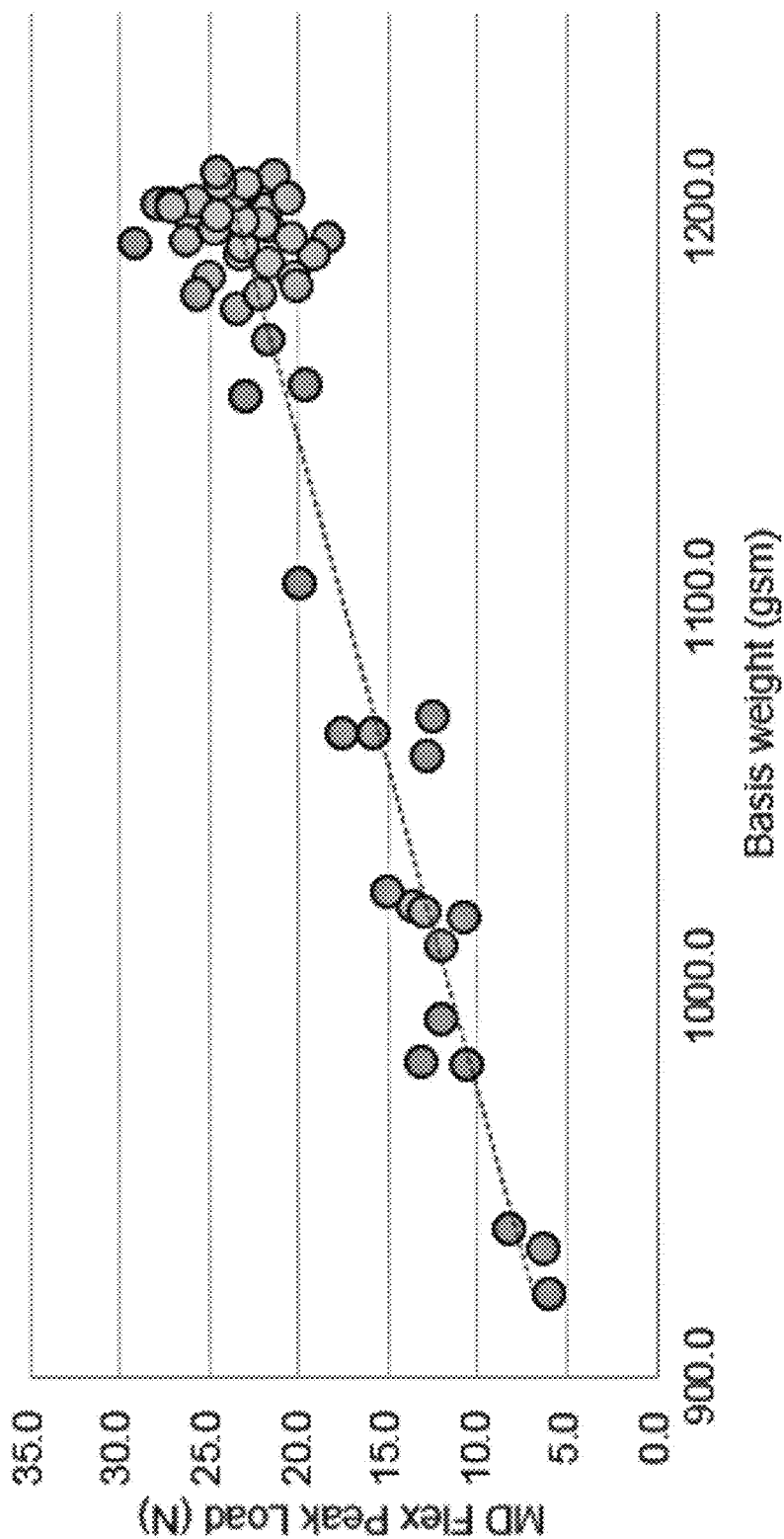
FIG. 31 is graph showing a correlation between flexural peak load and basis weight, in accordance with some embodiments.

The correlation between flexural peak load and basis weight was also investigated by using statistical tools. Multi-variable regression analysis was performed by using Minitab® 18. The basis weight, glass content, and as-produced density were considered as variables (the variables can be proved that they are independent), and the flexural peak load was considered as response. Based on the output, which is shown in Table I and FIG. 31, the results were consistent with there being a strong relationship between basis weight and flexural peak load.

TABLE 1

Regression Statistics

| | |
|---|---|
| Multiple R | 0.923 |
| R Square | 0.852 |
| Adjusted R square | 0.847 |
| Observations | 56 |

Unless otherwise specified, specimens were cut along the machine direction for the tested samples.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

The invention claimed is:

1. A method of producing a vehicle headliner comprising a composite material configured to permit air bag deployment, the method comprising:
    disposing a dispersion comprising a substantially homogeneous mixture of a thermoplastic material and reinforcing fibers onto a forming support element;
    providing a pressure to less than an entire surface of a top side of the forming support element comprising the disposed dispersion to provide a porous web comprising a variable basis weight at different areas of the web; and
    drying the porous web comprising the variable basis weight to provide a composite material comprising a porous core layer with a variable basis weight across a width of the porous core layer.

2. The method of claim 1, further comprising providing a negative pressure to an underside of the forming support element comprising the disposed dispersion.

3. The method of claim 1, further comprising providing a negative pressure to a central area of an underside of the forming support element comprising the disposed dispersion to provide the central area with a higher basis weight than at edges of the porous core layer.

4. The method of claim 1, wherein providing the pressure to less than the entire surface of the top side comprises providing a positive pressure to the top side of the forming support element comprising the disposed dispersion.

5. The method of claim 4, wherein providing the pressure to less than the entire surface of the top side comprises providing the positive pressure to a central area of the forming support element comprising the disposed dispersion to provide the central area with a higher basis weight than at edges of the porous core layer.

6. The method of claim 1, further comprising providing a negative pressure to an underside of the forming support element comprising the disposed dispersion, and wherein providing the pressure to less than the entire surface of the top side comprises providing a negative pressure to the top side of the forming support element comprising the disposed dispersion.

7. The method of claim 6, further comprising providing a greater negative pressure to the underside of the forming support element than the negative pressure provided to the top side of the forming support element at a central area of the forming support element to provide the central area with a higher basis weight than at edges of the porous core layer.

8. The method of claim 1, further comprising providing negative pressure to an underside of the forming support element, and wherein providing the pressure to less than the entire surface of the top side comprises providing a positive pressure to the top side of the forming support element.

9. The method of claim 8, further comprising configuring the negative pressure provided to the underside of the forming support element to be substantially uniform across the underside of the forming support element and configuring the top side pressure to be greater at a central area of the forming support element to provide the central area with a higher basis weight than at edges of the porous core layer.

10. The method of claim 1, further comprising disposing a mask on an underside of the forming support element and providing a negative pressure to areas of the web not covered by the disposed mask.

11. The method of claim 1, further comprising disposing a first skin on a first surface of the porous core layer.

12. The method of claim 11, wherein the disposed first skin comprises a variable basis weight.

13. The method of claim 11, further comprising disposing a second skin on a second surface of the porous core layer.

14. The method of claim 13, wherein the disposed second skin comprises a variable basis weight.

15. The method of claim 13, further comprising coupling a decorative layer to the disposed second skin.

16. The method of claim 1, further comprising coupling a second porous core layer to the porous core layer.

17. The method of claim 16, wherein the second porous core layer comprises a substantially uniform basis weight at different areas of the second porous core layer.

18. The method of claim 16, wherein the second porous core layer comprises a variable basis weight at different areas of the second porous core layer.

19. The method of claim 16, further comprising coupling a first skin to a first surface of the porous core layer.

20. The method of claim 1, further comprising disposing the dispersion on the forming support element while the pressure is being provided to the forming support element.

* * * * *